US012634104B2

(12) United States Patent
Duan et al.

(10) Patent No.: US 12,634,104 B2
(45) Date of Patent: May 19, 2026

(54) WAVEFORM DESIGNS FOR HALF-DUPLEX MONOSTATIC SENSING

(71) Applicant: QUALCOMM Incorporated, San Diego, CA (US)

(72) Inventors: Weimin Duan, San Diego, CA (US); Kangqi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/359,058

(22) Filed: Jul. 26, 2023

(65) Prior Publication Data

US 2025/0038942 A1 Jan. 30, 2025

(51) Int. Cl.
  *H04L 5/16* (2006.01)
  *H04L 27/26* (2006.01)
(52) U.S. Cl.
  CPC ............ *H04L 5/16* (2013.01); *H04L 27/2666* (2013.01); *H04L 27/2678* (2013.01)
(58) Field of Classification Search
  None
  See application file for complete search history.

(56) References Cited

U.S. PATENT DOCUMENTS

2021/0286045 A1* 9/2021 Bayesteh ............. H04B 7/0695
2023/0086144 A1* 3/2023 Roy ........................ G01S 7/006
                                              370/329
2023/0137479 A1* 5/2023 Zhang .................... H04K 3/822
                                              370/329
2023/0288528 A1* 9/2023 Feng .................. H04L 27/2657
2023/0309144 A1* 9/2023 Zhu .................... H04W 56/0015
2024/0022386 A1* 1/2024 Bhamri ..................... H04L 5/14
2024/0147249 A1* 5/2024 Zou ........................ H04W 16/14

FOREIGN PATENT DOCUMENTS

CN        103546888 A      1/2014
WO        2021248404 A1   12/2021
WO        2022109772 A1    6/2022
WO        2022133951 A1    6/2022

OTHER PUBLICATIONS

International Search Report and Written Opinion—PCT/US2024/036392—ISA/EPO—Oct. 24, 2024.

* cited by examiner

*Primary Examiner* — Lonnie V Sweet
(74) *Attorney, Agent, or Firm* — Holland & Hart LLP

(57) ABSTRACT

Techniques are provided for defining waveforms for half-duplex monostatic radio frequency (RF) sensing. An example method for performing RF sensing operations includes receiving assistance data for radio frequency sensing operations including at least a waveform time domain parameter and a waveform periodicity parameter, and performing radio frequency sensing operations utilizing the waveform time domain parameter and the waveform periodicity parameter.

28 Claims, 19 Drawing Sheets

250
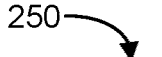
270 LMF
272 SLP
260 5GC
266
264 AMF SMF UPF 262
265 265 263 263
220 NEW RAN
224 ng-eNB gNB 222
223
204
_FIG. 2B_

*FIG. 3A*

Transmit and Receive

Figure 9:
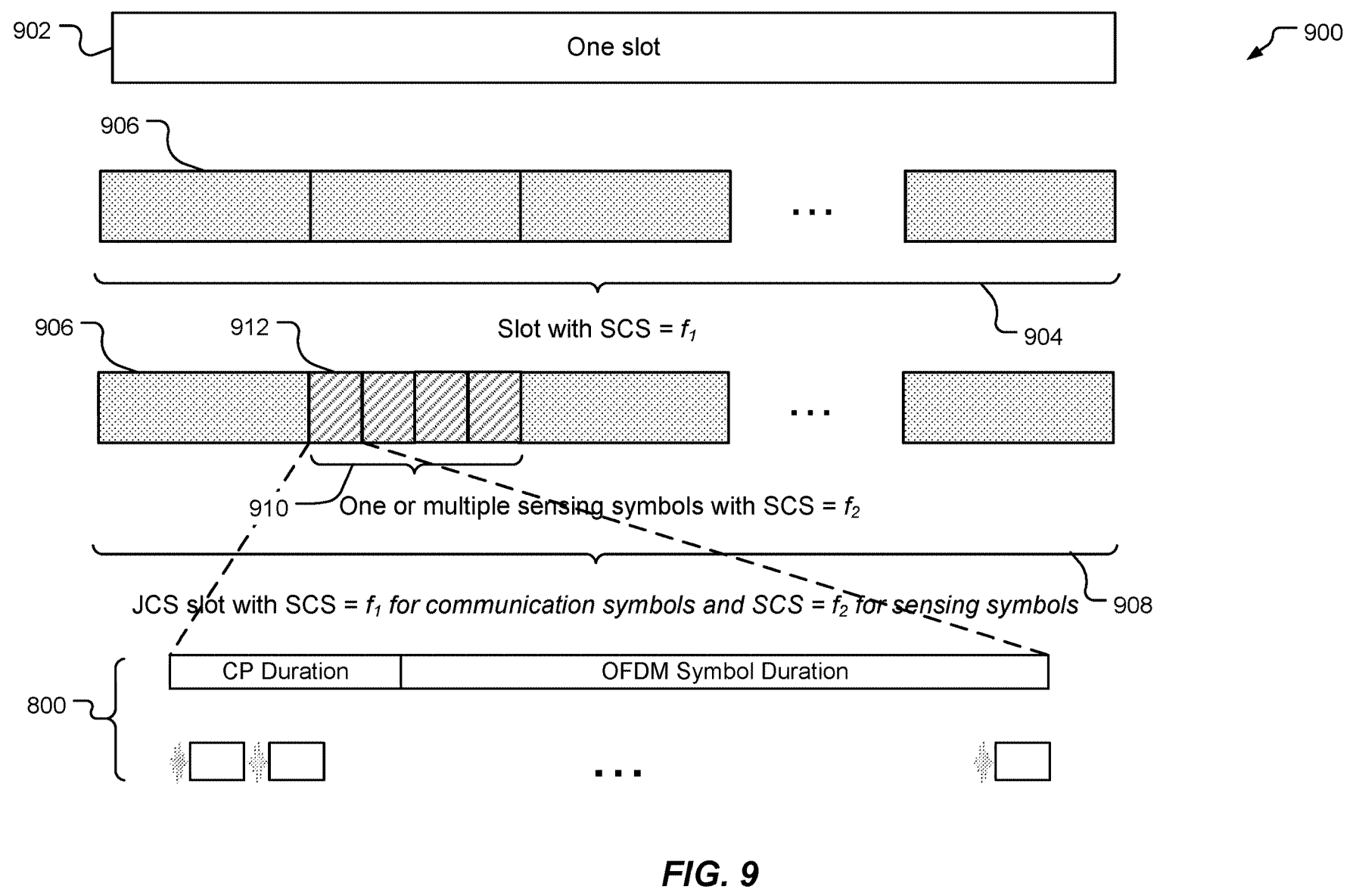

900

One slot

902

906

904

Slot with SCS = $f_1$

906

912

906

One or multiple sensing symbols with SCS = $f_1$

910

JCS slot with SCS = $f_1$ for communication symbols and SCS = $f_2$ for sensing symbols

908

CP Duration    OFDM Symbol Duration

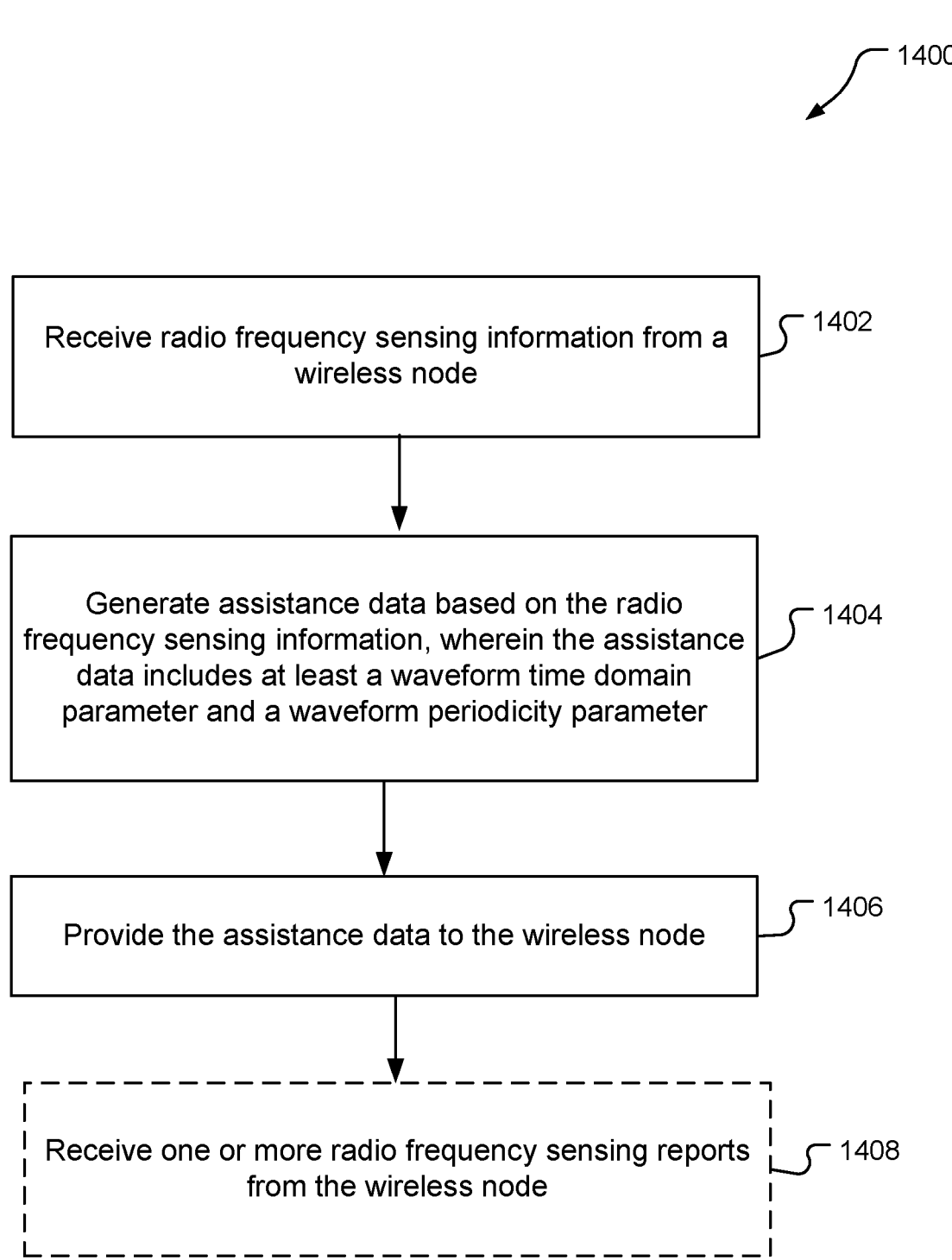

1400

1402

Receive radio frequency sensing information from a
wireless node

1404

Generate assistance data based on the radio
frequency sensing information, wherein the assistance
data includes at least a waveform time domain
parameter and a waveform periodicity parameter

1406

Provide the assistance data to the wireless node

1408

Receive one or more radio frequency sensing reports
from the wireless node

*FIG. 14*

WAVEFORM DESIGNS FOR HALF-DUPLEX MONOSTATIC SENSING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards. 5G enables the utilization of radio frequency (RF) signals for wireless communication between network nodes, such as base stations, user equipment (UEs), vehicles, factory automation machinery, and the like. The RF signals may also be used for other purposes, such as RF sensing. For example, RF sensing signals may be utilized in security systems (e.g., object detection), medical systems, motion detection, gesture recognition, and other such applications.

SUMMARY

An example method for performing RF sensing operations according to the disclosure includes receiving assistance data for radio frequency sensing operations including at least a waveform time domain parameter and a waveform periodicity parameter, and performing radio frequency sensing operations utilizing the waveform time domain parameter and the waveform periodicity parameter.

An example method for providing radio frequency sensing assistance data according to the disclosure includes receiving radio frequency sensing information from a wireless node, generating assistance data based on the radio frequency sensing information, wherein the assistance data includes at least a waveform time domain parameter and a waveform periodicity parameter, and providing the assistance data to the wireless node.

Items and/or techniques described herein may provide one or more of the following capabilities, as well as other capabilities not mentioned. A wireless node may be capable of transmitting and/or receiving radio frequency (RF) sensing signals. The wireless node may utilize the same receivers for both communications and RF sensing operations. A waveform for half-duplex monostatic sensing may be based on a RF sensing application and/or the capabilities of the wireless node. The duration of a RF sensing pulse and the periodicity of the waveform may be configured by the wireless node or a network entity. A half-duplex monostatic sensing waveform may be configured based on the numerology of a OFDM or a CP-OFDM scheme. RF sensing operations may be multiplexed with communication operations. Mixed numerologies may be used to enable communication and RF sensing operations. Half-duplex operation may reduce costs by reducing the complexity of components in the wireless node, as well as avoid the self-interference issues associated with full duplex RF sensing. Other capabilities may be provided and not every implementation according to the disclosure must provide any, let alone all, of the capabilities discussed.

BRIEF DESCRIPTION OF THE DRAWINGS

The accompanying drawings are presented to aid in the description of examples of one or more aspects of the disclosed subject matter and are provided solely for illustration of the examples and not limitations thereof:

FIGS. 2A and 2B illustrate example wireless network structures.

FIGS. 3A to 3C are simplified block diagrams of several sample components that may be employed in wireless communication nodes and configured to support communication.

FIG. 9 is an example of RF sensing signals in a CP-OFDM scheme with mixed numerologies.

FIG. 14 is an example process flow diagram of a method for providing RF sensing assistance data.

DETAILED DESCRIPTION

Figure 1:
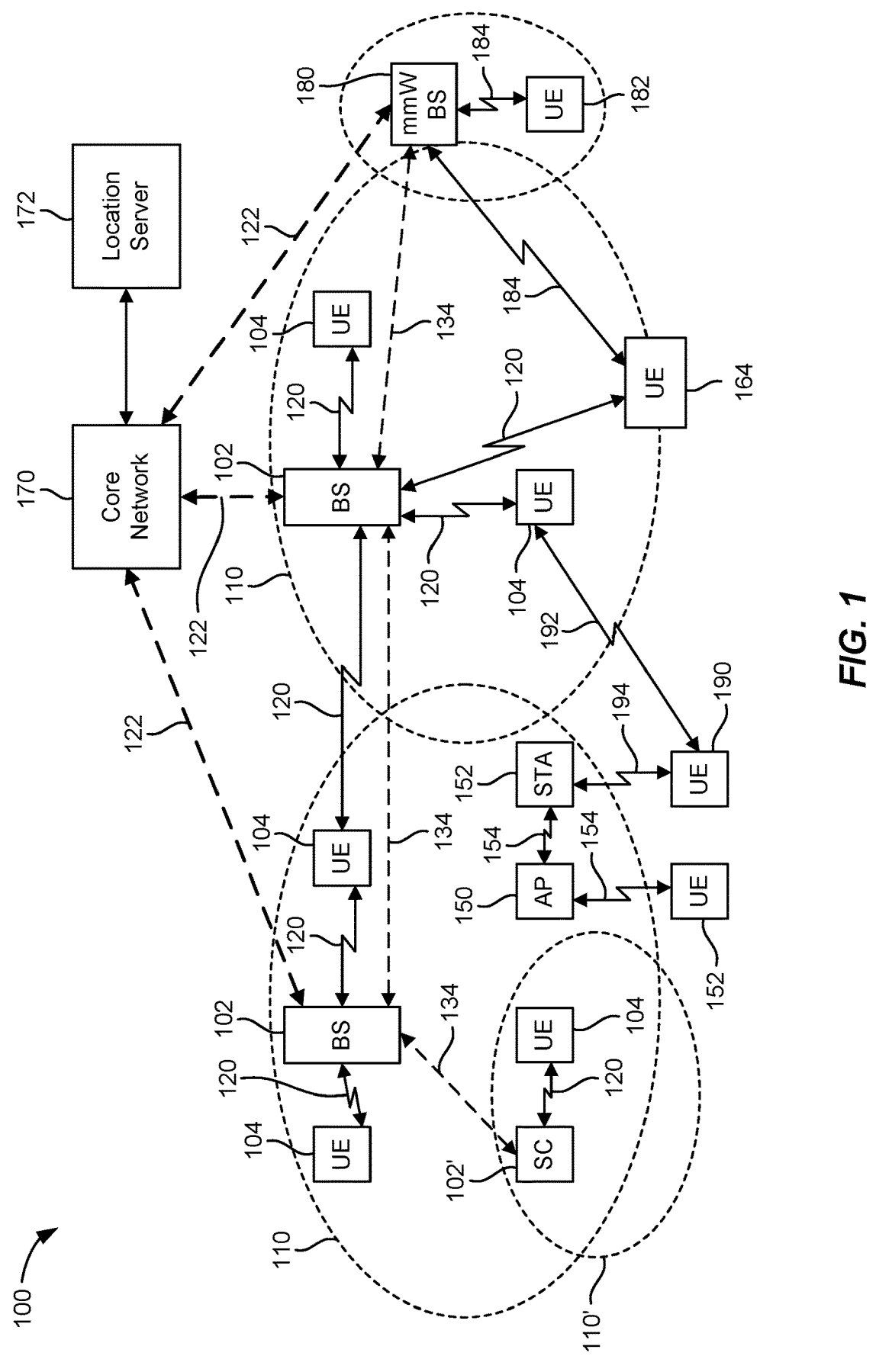
FIG. 1 illustrates an example wireless communications system.

Techniques are provided herein for defining waveforms for half-duplex monostatic radio frequency (RF) sensing. In general, RF sensing may be regarded as consumer-level radar with advanced detection capabilities. For example, RF sensing may be used in applications such as security (e.g., intruder detection), health monitoring (e.g., heartbeat detection, respiration rate monitoring, etc.), gesture recognition (e.g., human activity recognition, keystroke detection, sign language recognition), contextual information acquisition (e.g., location detection/tracking, direction finding, range estimation), automotive Radar (e.g., smart cruise control, collision avoidance) and the like. In an example, RF signals such as 3GPP NR FR2/FR2x/FR4 are particularly suited for range detection applications. The systems and methods herein utilize different waveform designs to enable mobile devices to perform half-duplex monostatic RF sensing.

In an example, Orthogonal Frequency Division Multiplexing (OFDM) waveforms may be utilized for joint communication and RF sensing use cases (e.g., joint communication and sensing). OFDM may be used to enable in-band multiplexing between communication channels and other cellular reference signals and physical layer (PHY) channels). A user equipment (UE), including a receiver and a transmitter, may be configured to perform half-duplex monostatic sensing by turning off the receiver when the transmitter is operating, and turning off the transmitter when the receiver is operating. Further, in some embodiments, the UE may be configured to perform time division multiplexing (TDM) between a sensing pulse train and communication symbol transmissions. Further, in some embodiments, the sensing pulse train may be compatible with Cyclic Prefix Orthogonal Frequency Division Multiplexing (CP-OFDM).

In general, for long range sensing, a pulse compressing capable waveform with long signal duration may be utilized. For example, Frequency Modulated Continuous Wave (FMCW) waveforms and OFDM waveforms with NR numerologies may be configured to meet the link budget requirements with a limited peak power. The long duration sensing signal, however, may implicitly require a sensing node (e.g., a UE, a base station) to be capable of full duplex operation. Not all sensing nodes may be capable of full duplex operations. The techniques provided herein utilize half-duplex operation for monostatic sensing for long and short range sensing. The half-duplex sensing scheme may also be used for short-range target sensing without Doppler estimation or with low resolution Doppler estimation. In an example, without a Doppler estimation requirement or with a low resolution Doppler estimation, the sensing signal span in time domain may be reduced. Further, since half-duplex operation may avoid issues associated with self-interference, range and angle estimation for static objects may be realized. Doppler measurements may be estimated utilizing half-duplex monostatic sensing techniques. These techniques and configurations are examples, and other techniques and configurations may be used.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STA 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over communication links 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
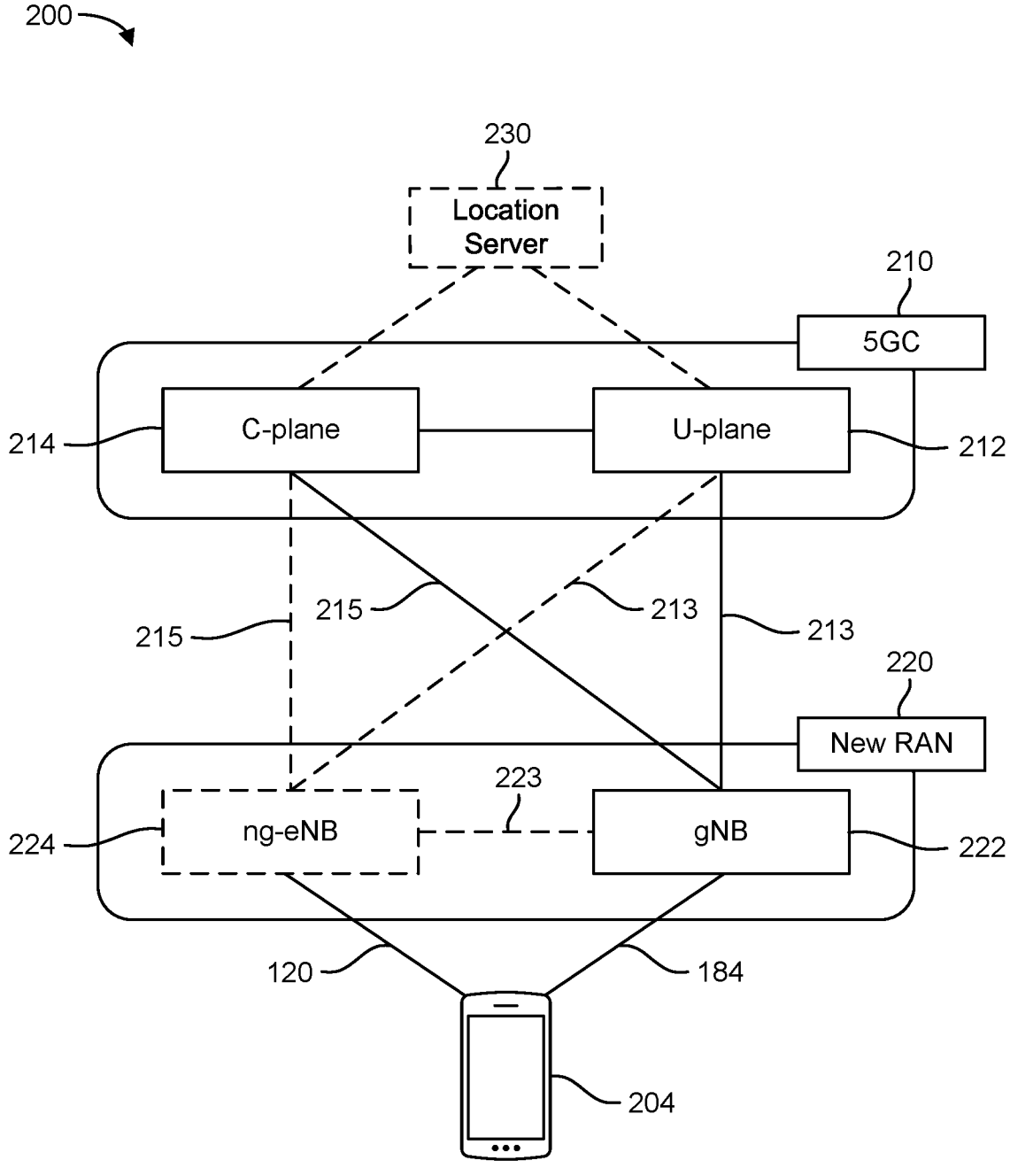

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
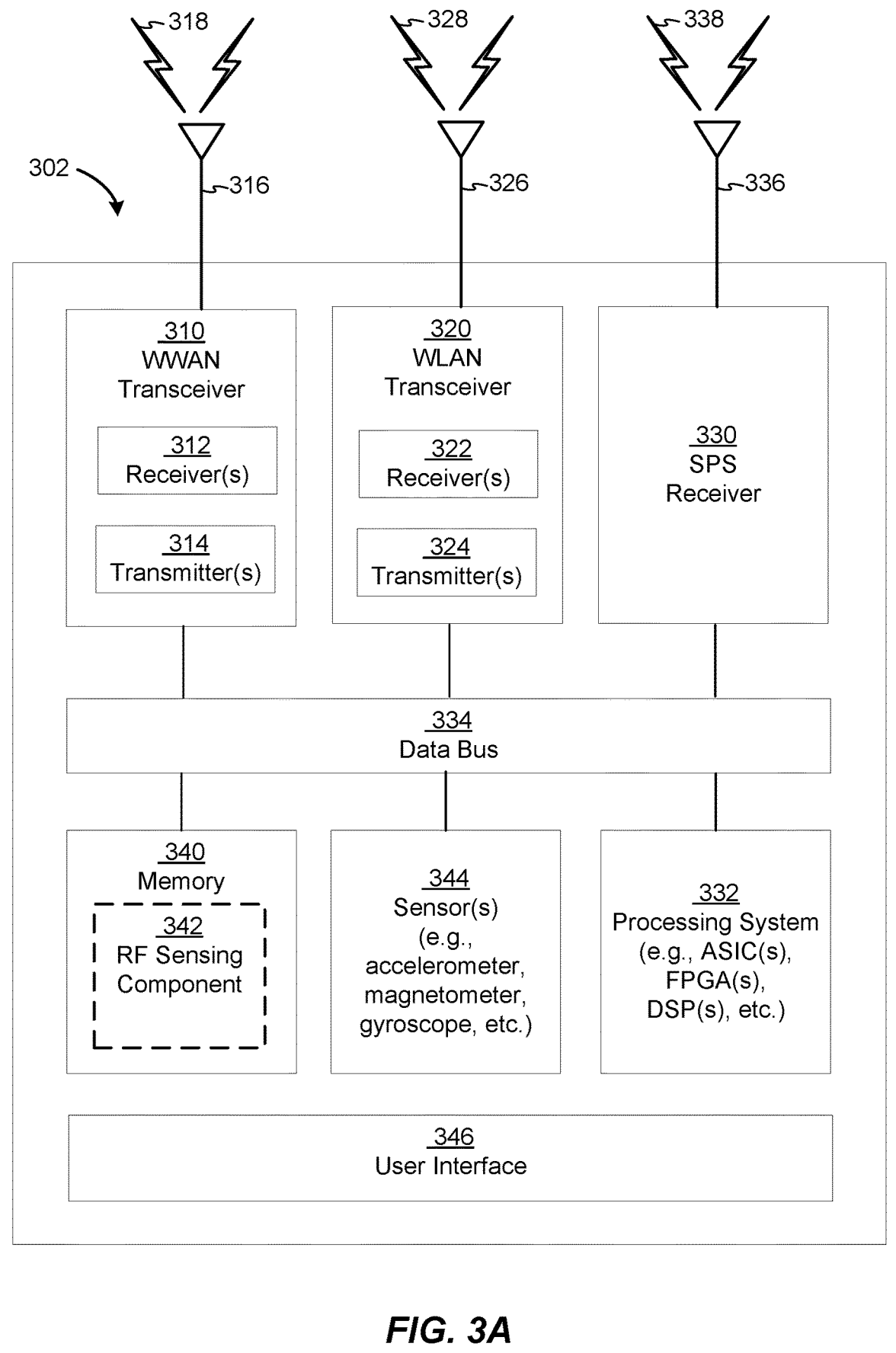
Figure 3B:
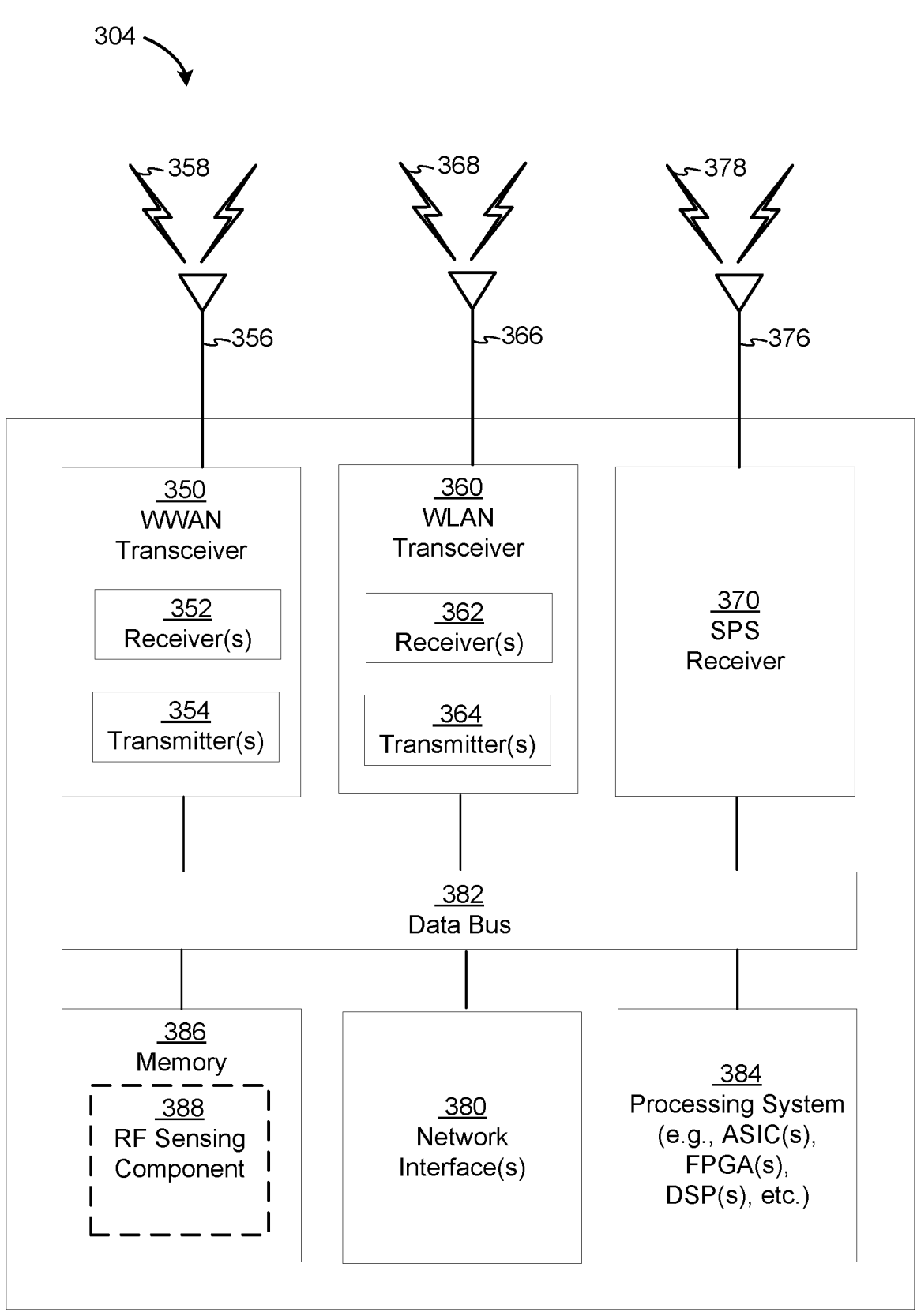
Figure 3C:
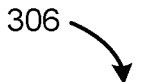
Figure 3C:
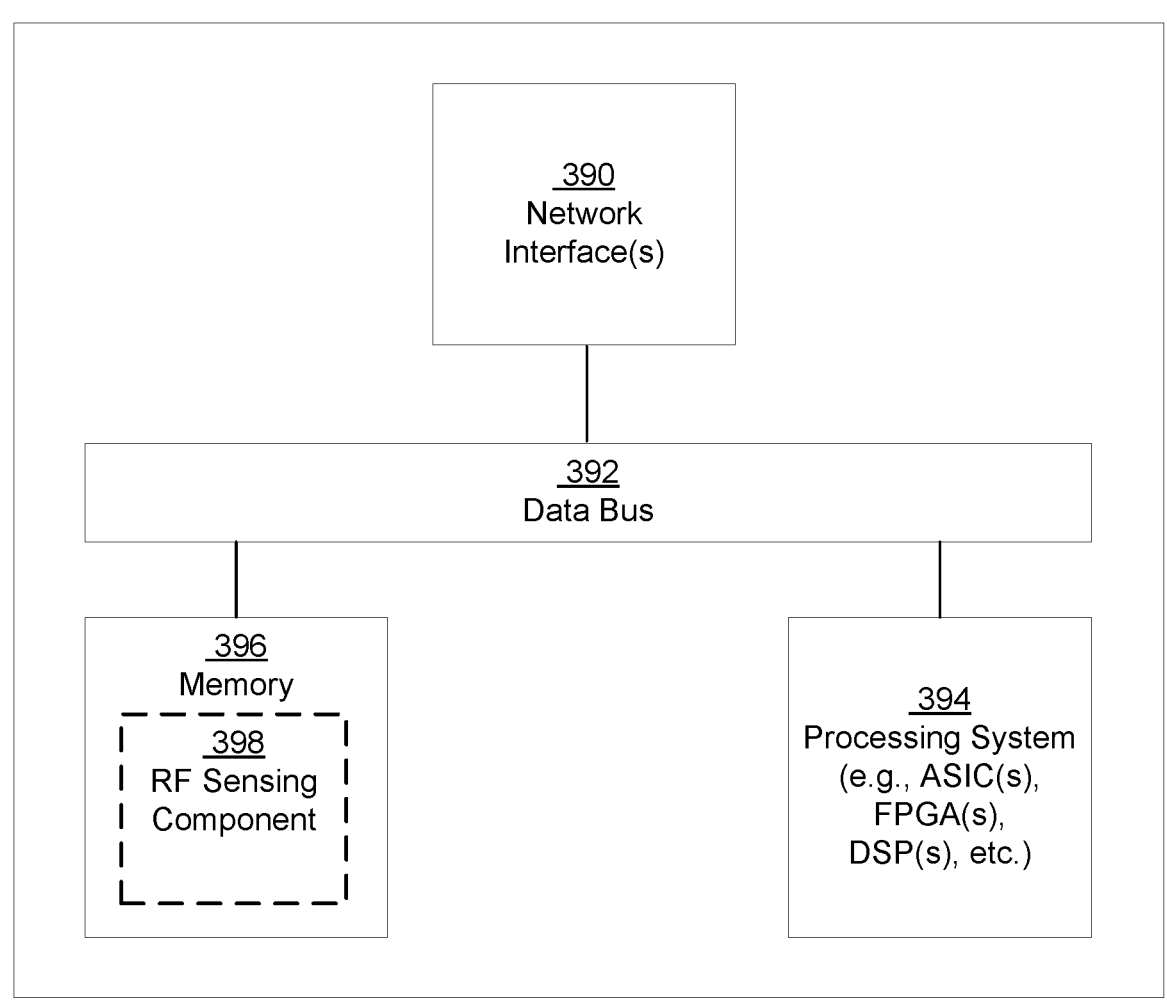

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, joint communication and RF sensing (i.e., joint communication and sensing (JCS) operations), and for providing other processing functionality. The base station 304 includes a processing system 384 for providing functionality relating to, for example, RF sensing operations as disclosed herein, and for providing other processing functionality. The network entity 306 includes a processing system 394 for providing functionality relating to, for example, RF sensing operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by components 310 to 346 may be implemented by processor and memory component(s) of the UE 302 (e.g., by execution of appropriate code and/or by appropriate configuration of processor components). Similarly, some or all of the functionality represented by components 350 to 388 may be implemented by processor and memory component(s) of the base station 304 (e.g., by execution of appropriate code and/or by appropriate configuration of processor components). Also, some or all of the functionality represented by components 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
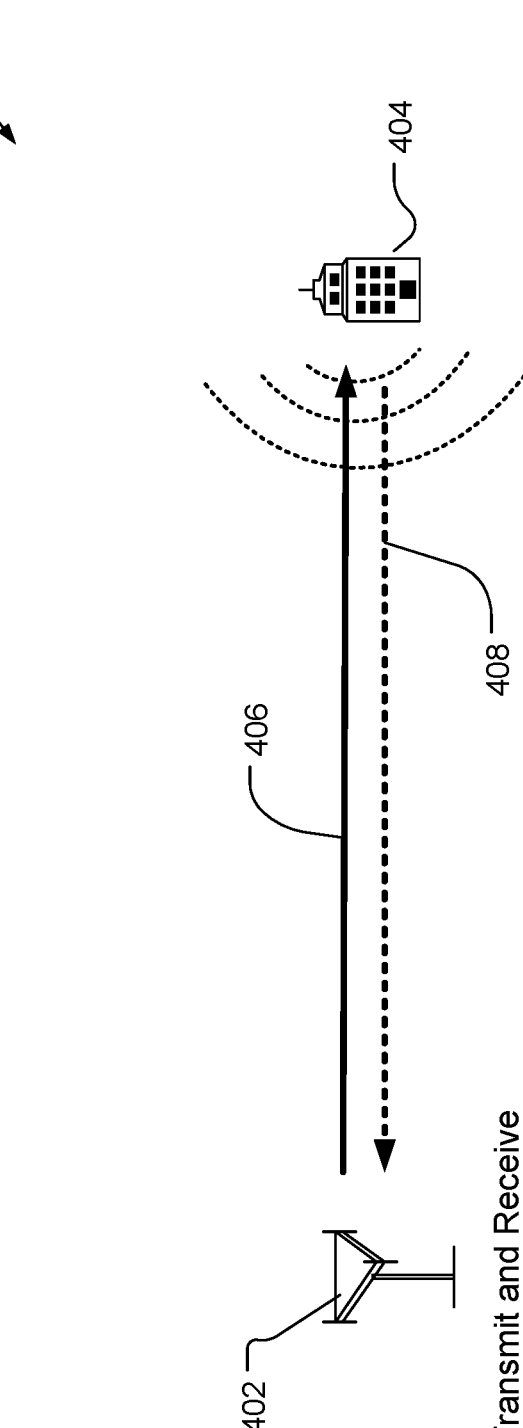
FIG. 4A illustrates an example monostatic RF sensing system.
Figure 4B:
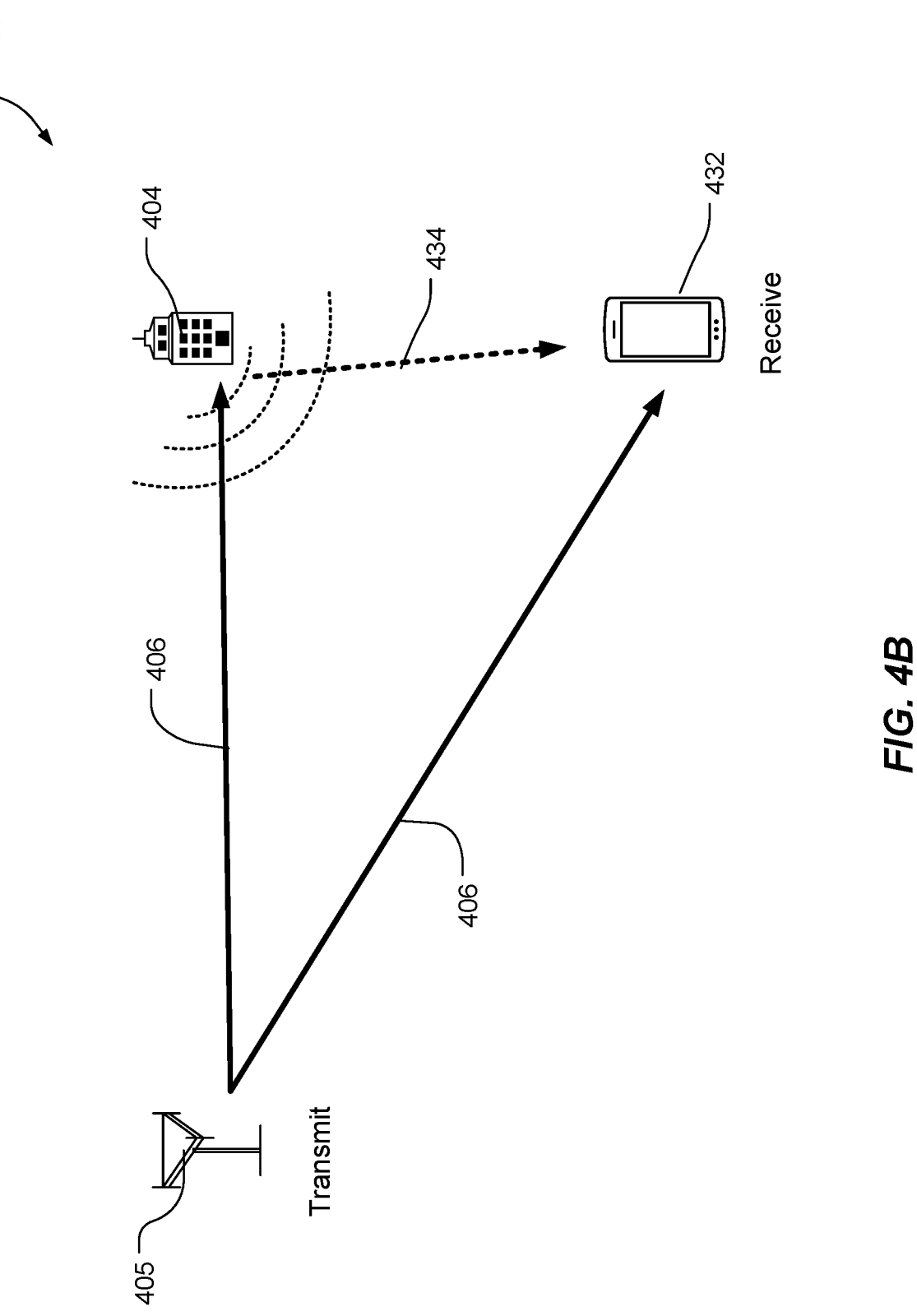
FIG. 4B illustrates an example bistatic RF sensing system.

In general, there are different types of RF sensing operations, and in particular, monostatic and bistatic RF sensing. FIGS. 4A and 4B illustrate two of these various types of RF sensing. Specifically, FIG. 4A is a diagram 400 illustrating a monostatic RF sensing scenario, and FIG. 4B is a diagram 430 illustrating a bistatic RF sensing scenario. In FIG. 4A, a base station 402 may be configured for full duplex operation and thus the transmitter (Tx) and receiver (Rx) are co-located. For example, a transmitted radio frequency (RF) signal 406 may be reflected off of a target object, such as a building 404, and the receiver on the base station 402 is configured to receive and measure a reflected beam 408. This is a typical use case for traditional, or conventional, radar. In an example, monostatic RF sensing may be realized with half-duplex operation such that a transceiver may be configured to transmit a RF sensing signal at a first time, and then receive a reflected signal at a second time. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a beam, such as an omnidirectional downlink RF signal which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., PRS) to the UE 432, but some of the RF sensing signals reflect off a target object such as the building 404. The UE 432 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path. Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive-beam forming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 would perform object detection based on the uplink RF signals just like the UE 432 does based on the downlink RF signals.

Figure 5:
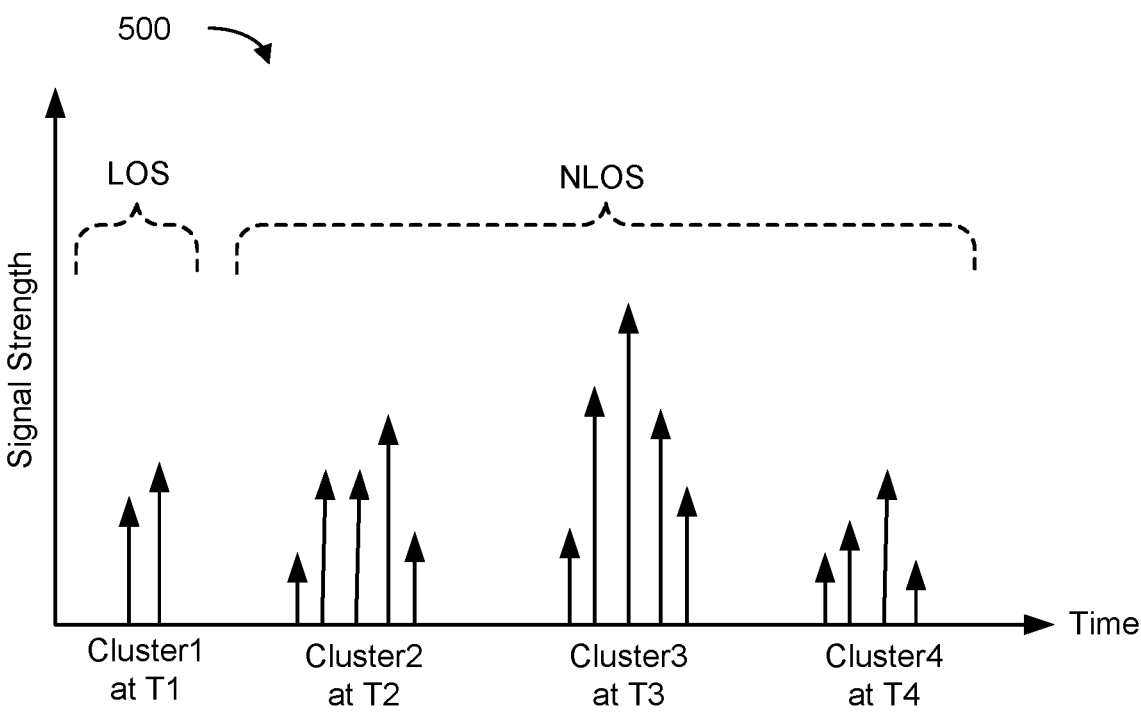
FIG. 5 is an example graph showing a RF channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6:
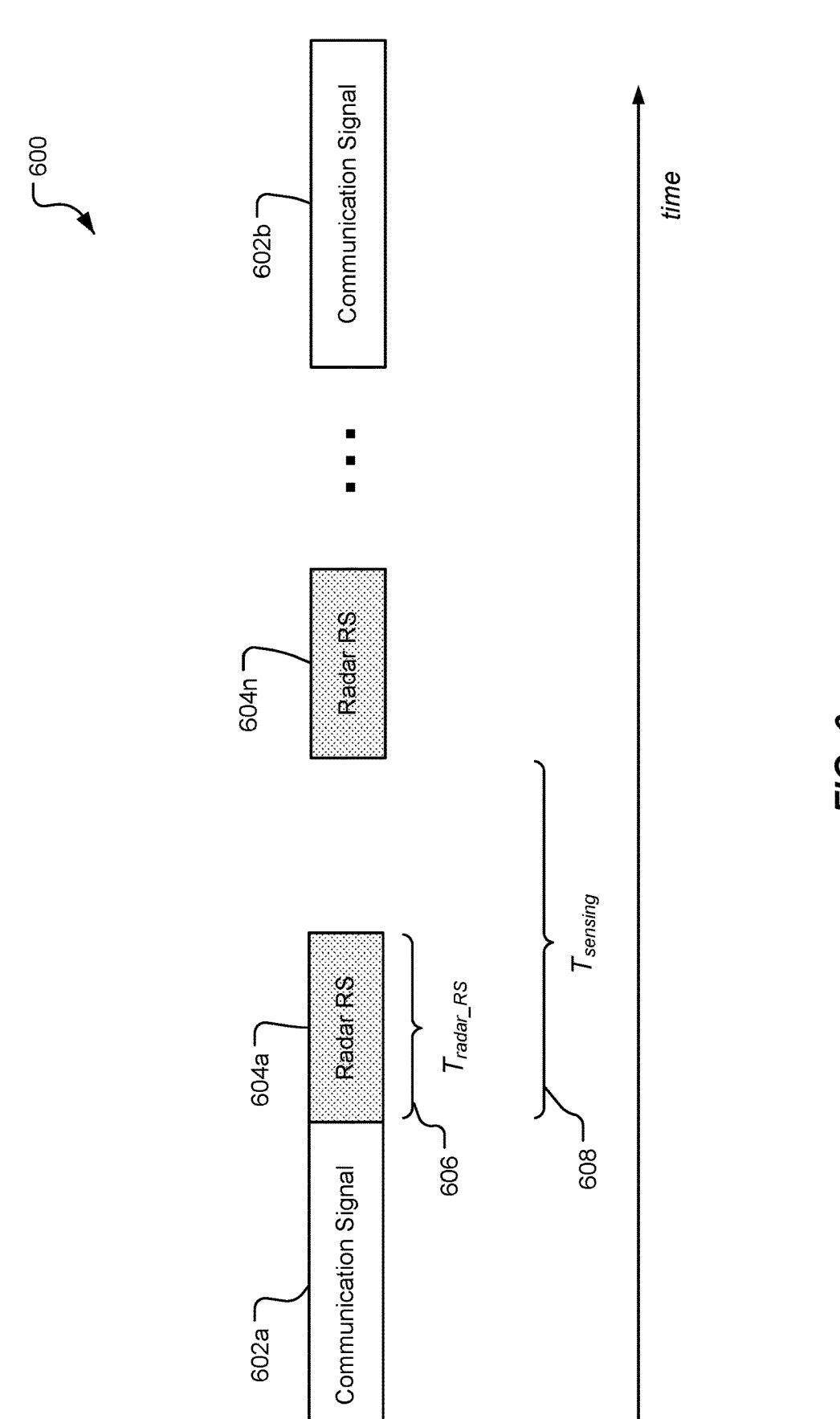
FIG. 6 is an example timing diagram for communication and monostatic RF sensing signals.

Referring to FIG. 6, an example timing diagram 600 for communication and monostatic RF sensing is shown. The timing diagram 600 includes communication signaling periods 602a, 602b and RF sensing reference signals (RS) 604a, 604n, which each RF sensing RS 604a, 604n having a transmit duration of $T_{radar\_RS}$ 606. The numbers, relative locations, and durations of the signaling and sensing periods on the timeline are examples, and not limitations, as other timing schemes may be used. In general, an RF sensing system (e.g., radar systems) emit pulses continuously during RF sensing operations to build up a discernible echo from a target object. In half-duplex monostatic sensing, the period of the RF sensing transmissions may impact the maximum range of the RF sensing operations because the system must wait to receive a return signal before transmitting the next RF sensing RS (e.g., RF sensing RS 604n) or other pulses. In an example, the RF sensing period $T_{sensing}$ 608 may be measured from the start of a first RF sensing RS 604a to the start of a next RF sensing RS 604n. To reduce potential range ambiguity issues, the duration of $T_{sensing}$ 608 may be defined as:

$$T_{sensing} \geq \frac{2R_{max}}{c} + T_{radar\_RS} \tag{1}$$

where, $R_{max}$ is the maximum sensing range;

$T_{radar\_RS}$ is the duration of the RF sensing RS; and c is the speed of light.

In operation, if the RF sensing RS repetition frequency is too high (e.g., $T_{sensing}$608 is too small), echo signals from some targets may arrive after the next RF sensing RS 604n is transmitted. This may result in an ambiguity in range measurement since such an echo may appear to be at a much shorter range than the actual target.

The waveforms of the RF sensing RS 604a, 604n may be based on known radar pulse waveforms such as FMCW. Other waveforms, such as OFDM RS (e.g., PRS, TRS, CSI-RS) may also be used. In an example, ultrawideband (UWB) pulses may be used. The waveform configuration may be based on the capabilities of the transmitting device (e.g., UE, gNB, IoT device, etc.) and/or network requirements. In an example, the sensing node (e.g., UE) may be configured to provide an on-demand request for a waveform type and associated parameters. The parameters may explicitly include the $T_{radar\_RS}$ 606 and the $T_{sensing}$ 608, or the on-demand request may identify an RF sensing application or use case which may be associated with the $T_{radar\_RS}$ 606 and the $T_{sensing}$608 parameters.

A sensing node (e.g., UE) may be configured to at least indicate one or more use case parameters which may drive an RF sensing waveform requirement. For example, the use case requirement may be a minimum range (i.e., Rmin), which may be used to determine the requirement for $T_{radar\_RS}$ 606. The $T_{radar\_RS}$ 606 may be lower bounded by the Tx/Rx switch time of the sensing node. The capabilities of a UE, for example, to quickly switch between Tx and Rx may impact the ability to sense close targets. In such a use case, a UE may explicitly indicate a minimum Tx/Rx switch time in a capability message or other network signaling, and then a network entity 306 (e.g., location server 230, LMF 270, or other network resource) may be configured to determine a $T_{radar\_RS}$ 606 parameter based on the UE's capabilities. The $R_{max}$ parameter (e.g., as described in eq. (1)), which indicates the shortest required $T_{sensing}$ 608 (i.e., along with $R_{min}$ or $T_{radar\_RS}$), may also be included in the capability message. In a tracking use case, the capability message and/or on-demand request may indicate the maximum speed and/or required speed resolution information, and the network entity 306 may be configured to determine waveform parameters. For example, the maximum speed (e.g., Doppler) may be based on the $T_{sensing}$ 608 parameter such that speed resolution is computed as $N^*T_{sensing}$, where N is the number of RF sensing RS pulses. Other capabilities and use cases may be considered by the network entity 306 to configure the RF sensing RS waveform. In an example, the RF sensing RS waveform may be based at least in part on the time and/or frequency domain numerologies in a 5G NR network.

Figure 7:
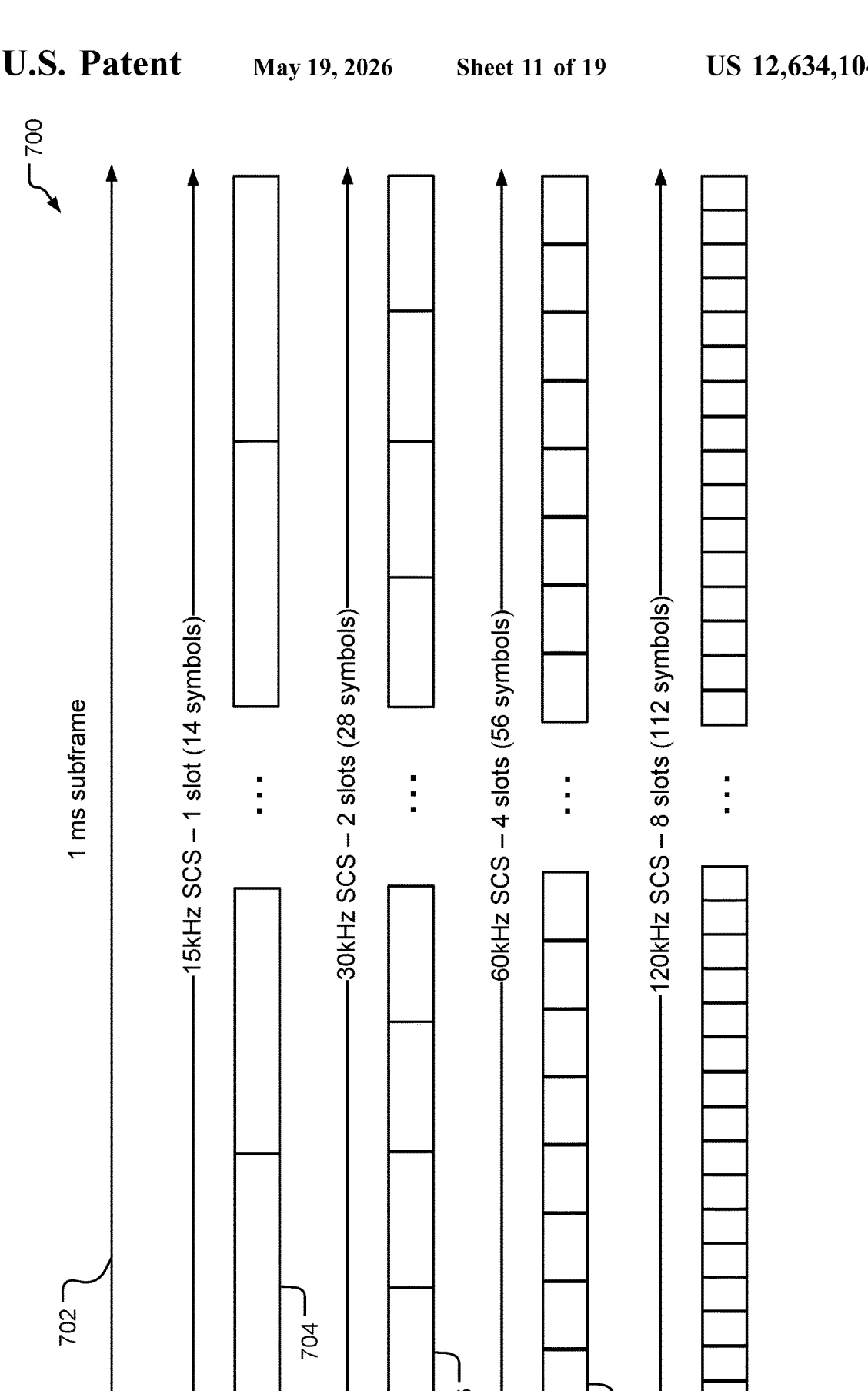
FIG. 7 is a diagram of example frequency domain numerologies including different subcarrier spacing (SCS) and the associated slots and symbols.

Referring to FIG. 7, a diagram 700 of example frequency domain numerologies including different subcarrier spacing (SCS) and associated slots and symbols are shown. A 5G radio frame has a fixed duration of 10 ms, and a subframe 702 has a fixed duration of 1 ms (e.g., each frame has 10 subframes 702). The slot duration and symbol duration depend upon the numerology, and thus the number of slots per subframe and the number of symbols per subframe also depend upon the numerology. The number of symbols per slot is always 14 when using a normal cyclic prefix and 12 when using an extended cyclic prefix. The diagram 700 illustrates the symbols belonging to a 1 ms subframe for different numerologies. For example, in a 15 kHz SCS, on subframe 702 includes 1 slot with a total of 14 symbols such as a first symbol 704. A 30 kHz SCS includes 2 slots per subframe, with a total of 28 symbols such as a second symbol 706. A 60 kHz SCS includes 4 slots per subframe, with a total of 56 symbols such as a third symbol 708. A 120 kHz SCS includes 8 slots per subframe, with a total of 112 symbols such as a fourth symbol 710. The slot durations for the respective numerologies are provided in Table 1 below:

TABLE 1

| Sub-carrier spacing (kHz) | Symbols/ slot | slots/ subframe | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

When a numerology of 15 kHz is used, in the time domain frame (e.g., 10 ms) is divided into 10 equally sized sub-frames of 1 ms each, and each subframe includes one time slot. In FIG. 7, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. The number of bits carried by each RE depends on the modulation scheme. In an example, the RF sensing signals described herein may be configured to conform to the symbol and slot formats described in FIG. 7. Other symbol and slot formats may also be used.

Figure 8:
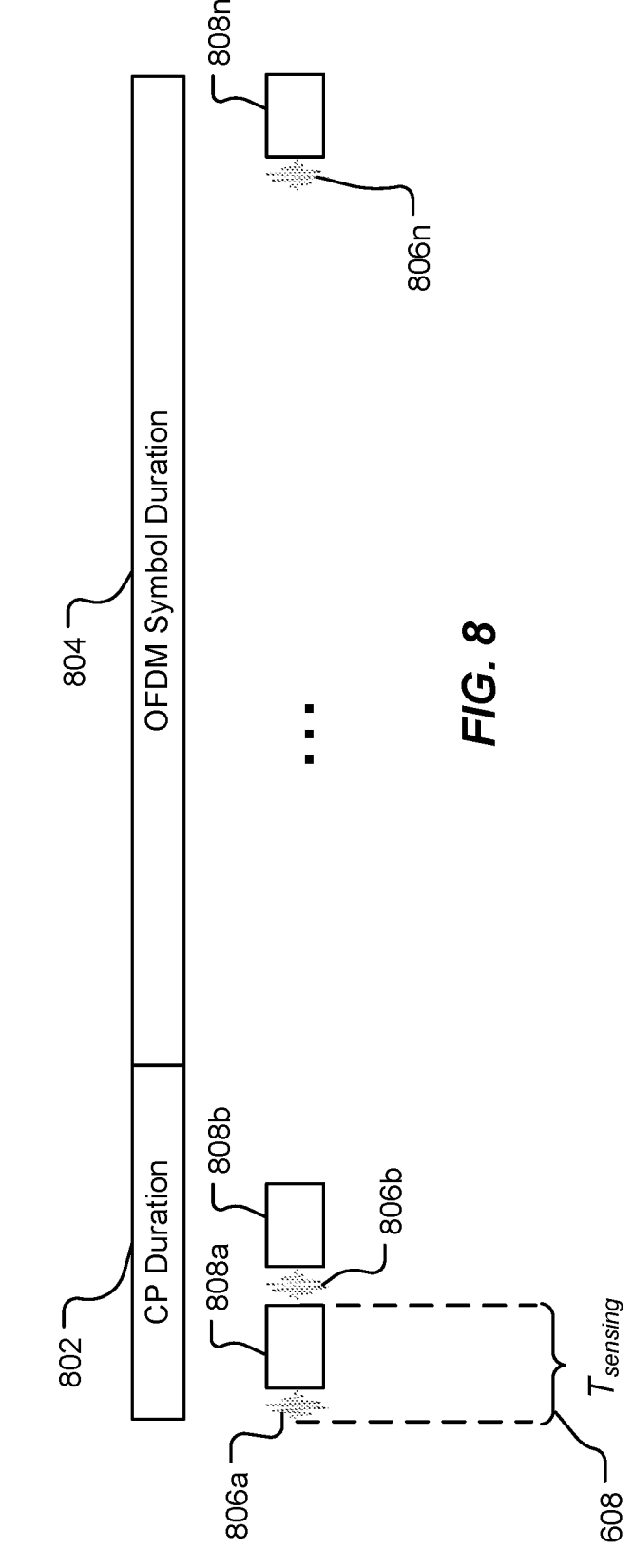
FIG. 8 is a diagram of example RF sensing signals within the duration of a symbol in a cyclic prefix orthogonal frequency division multiplexing (CP-OFDM) scheme.

Referring to FIG. 8, with further reference to FIG. 7, a diagram of example RF sensing signals within the duration of a symbol in a cyclic prefix orthogonal frequency division multiplexing (CP-OFDM) scheme is shown. FIG. 8 depicts an OFDM symbol 800 in the time domain including a cyclic prefix (CP) duration 802 and a OFDM symbol duration 804. The RF sensing node (e.g., a UE) may be configured to utilize time division multiplexing (TDM) for multiplexing the RF sensing RS and communication signals. For example, a train of RF sensing RS pulses 806a, 806b, 806n and corresponding listening periods 808a, 808b, 808n may occur within the duration of the symbol 800. In an example, referring to Table 1, in a 30 kHz SCS numerology, the duration of each OFDM symbol 800 is approximately 33.3 μs, with the CP duration 802 of approximately 2-3 μs. An indoor RF sensing use case may configure a UE to detect and/or track objects within a 10 m range, and thus may utilize a $T_{sensing}$ 608 parameter of approximately 60 nanoseconds (ns) (e.g., enough time for the 20 m roundtrip when an object is 10 m away). In this use case, 3 to 5 RF sensing pulses may be transmitted within the CP duration 802 alone. Additional pulses may be transmitted during the symbol duration 804.

Referring to FIG. 9, with further reference to FIG. 8, an example of RF sensing signals in an CP-OFDM scheme with mixed numerologies is shown. A numerology diagram 900 depicts example slots 902 with various symbol durations associated with different subcarrier spacing values. A first numerology 904 may be based on a first SCS frequency ($f_1$) and may comprise symbols having a first duration in time 906. For example, the first numerology 904 may utilize a SCS of 30 kHz with a symbol duration of 33.3 μs. For RF sensing operations, a mixed numerology slot 908 may be configured with symbols of different durations. Communication operations may utilize slots including one or more symbols based the on the first SCS ($f_1$), including symbols having the first duration in time 906, and RF sensing operations may utilize a second numerology 910 with one or more symbols based on a second SCS ($f_2$) comprising symbols having a second duration in time 912, which is less than the first duration in time 906. Thus, as depicted in FIG. 9, the RF sensing RS pulses in the symbol 800 may be configured to operate in the second SCS ($f_2$) symbol. For example, the second numerology 910 may utilize a SCS of 120 kHz with a symbol duration of 8.33 μs. In operation, the first SCS ($f_1$) may be used for communication symbols and the second SCS ($f_2$) may be used for RF sensing symbols. The number of different numerologies and symbol durations in the diagram 900 are examples, and not limitations, as other numerologies and symbol durations may also be used for RF sensing operations.

In an example, RF sensing operations may utilize wide-band radar signals with a sweeping frequency, such as Frequency-Modulation Continuous-Wave (FMCW) radar, to realize wide bandwidth accuracy with a small baseband bandwidth. Such frequency sweeping operations, however, may be problematic with OFDM waveforms because one subcarrier in an OFDM signal is fully dedicated even if that frequency is occupied for only a short period of time within the OFDM symbol. Thus, for a narrow SCS the OFDM symbol duration is long, and a radar signal (with frequency sweep) may occupy a wide range of frequencies for the duration of one full OFDM symbol. The partial utilization of the symbol duration during frequency sweeping is wasteful from a system resource perspective. The mixed numerology slot 908 may be used to reduce wasted symbol duration by utilizing the second numerology 910 for RF sensing. The larger SCS and the relatively shorter symbol duration in time 912 may reduce a RF sensing signal's time-frequency domain footprint while still enabling wideband frequency sweeping.

Figure 10:
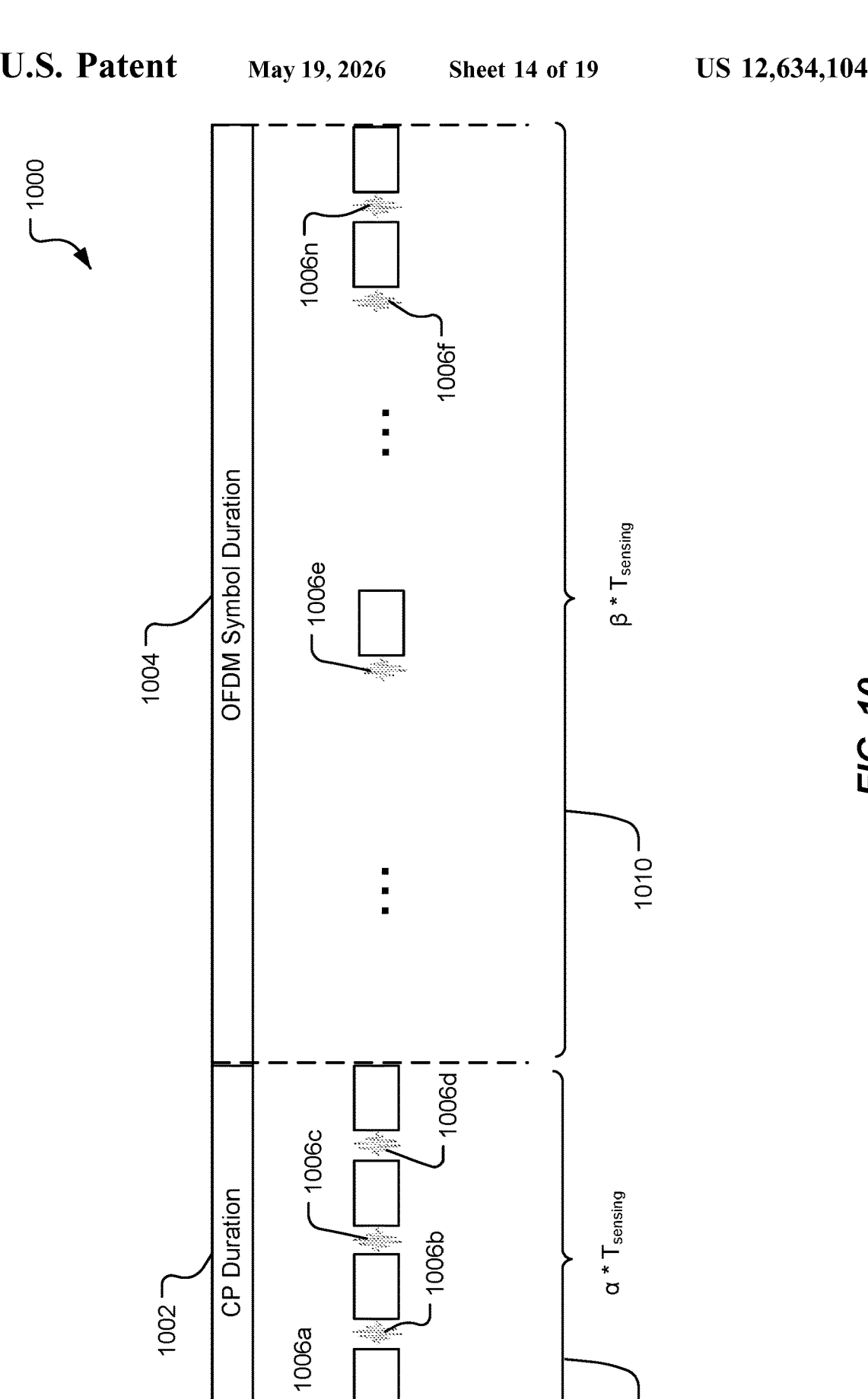
FIG. 10 is an example of RF sensing with a cyclic prefix and CP-OFDM symbol compatible pulse train.

Referring to FIG. 10, with further reference to FIG. 6, an example of RF sensing with a cyclic prefix and CP-OFDM symbol compatible pulse train is shown. An example symbol 1000 includes a CP duration 1002 and a symbol duration 1004 which are known to the sensing node or other network resources. The timing of RF sensing RSs 1006a-n and the corresponding listening periods are configured to be an integer fraction of the respective CP duration 1002 and the symbol duration 1004. For example, the CP duration 1002 may have a first pulse train 1008 including α pulses 1006a and listening durations (i.e., a combined duration of $T_{sensing}$ 608), and the symbol duration 1004 may have a second pulse train 1010 including β pulses and listening durations. As depicted in FIG. 10, α and β are integer values. The values of α and β are integer quotients of the respective CP duration 1002 and symbol duration 1004 when divided by the $T_{sensing}$ value. That is, the result of dividing the CP duration 1002 by the $T_{sensing}$ value is the integer value α, and the result of dividing the symbol duration 1004 by the $T_{sensing}$ value is the integer value β. The alignment of the pulse trains 1008, 1010 with the respective CP and symbol durations 1002, 1004 may enable frequency division multiplexing (FDM) within the symbol for communication and RF sensing waveforms.

In an example, the duration of $T_{sensing}$ may be scaled to increase the flexibility of the FDM between the communications and RF sensing operations. For example, increasing the duration of $T_{sensing}$ will reduce $\beta$ and thus allow more Resource Elements (REs) to be utilized for RF sensing. In the frequency domain, $1/\beta$ of the REs may be allocated for the RF sensing pulse train and the REs may be allocated for the OFDM communication symbols.

Figure 11A:
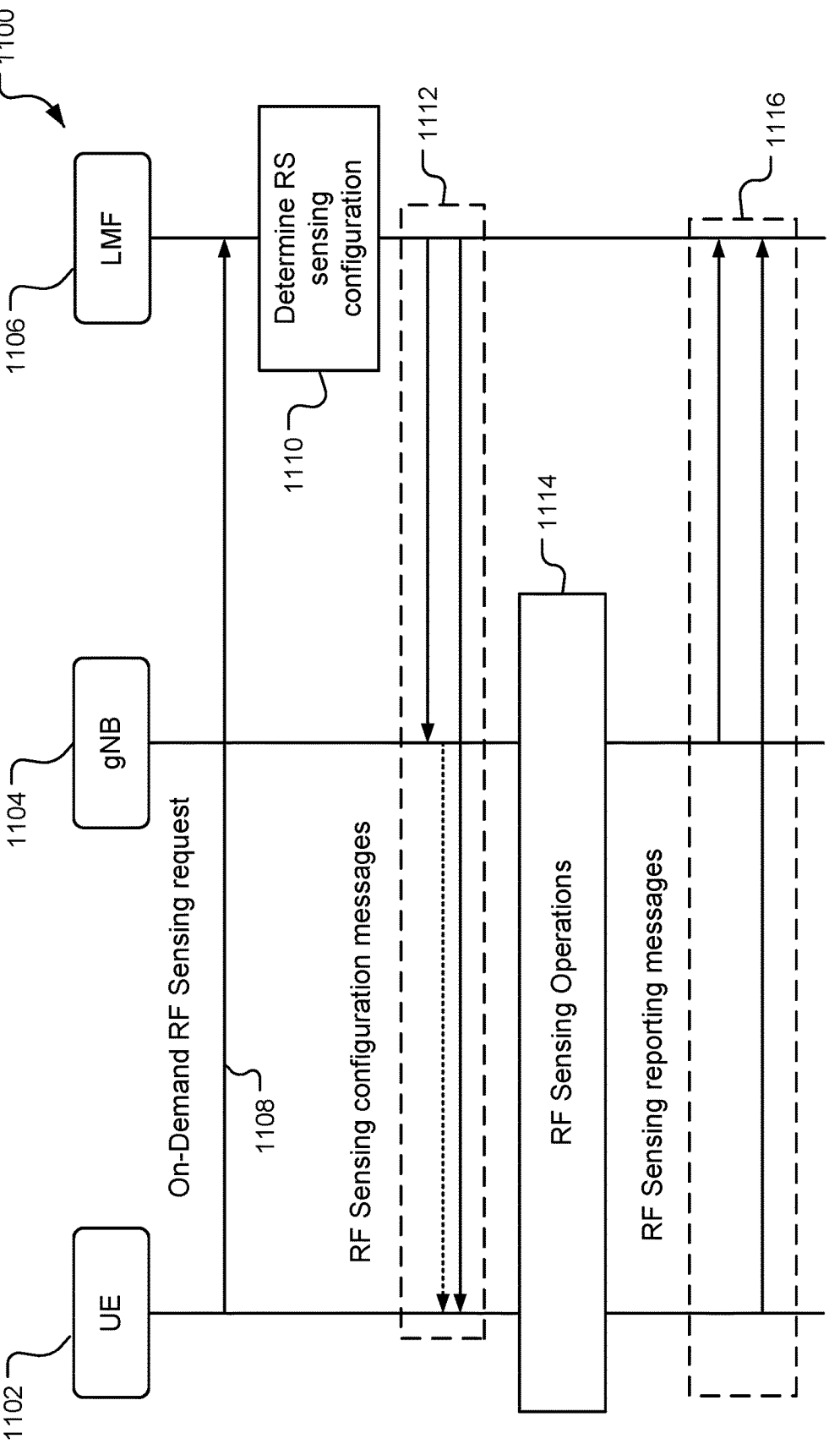
FIG. 11A is an example message flow diagram for providing on-demand radio frequency sensing configuration information.

Referring to FIG. 11A, an example message flow diagram 1100 for providing on-demand RF sensing configuration information is shown. The message flow diagram 1100 includes example nodes in the communication system such as an UE 1102, a gNB 1104, and a network entity 306, such as a LMF 1106. The nodes and messages in the message flow diagram 1100 are examples, and not limitations, as other nodes and messages may be used to provide on-demand RF sensing configuration information throughout the communications system 100. The LMF 1106 may communicate with the gNB 1104 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 1104 and the LMF 1106. The LMF 1106 and the UE 1102 may communicate using an LTE Positioning Protocol (LPP), which may be defined in 3GPP TS 36.355. The LMF 1106 and the UE 1102 may also or instead communicate using a New Radio Positioning Protocol (which may be referred to as NPP or NRPP), which may be the same as, similar to, or an extension of LPP. Here, LPP and/or NPP messages may be transferred between the UE 1102 and the LMF 1106 via the serving gNB (e.g., the gNB 1104).

The gNB 1104 may include a radio unit (RU), a distributed unit (DU), and a central unit (CU) (not shown in FIG. 11A). The RU, DU, and CU may be configured to divide the functionality of a gNB. An interface between the CU and the DU is referred to as an F1 interface. The Xn interface may be used for communications between different gNBs. The RU is configured to perform digital front end (DFE) functions (e.g., analog-to-digital conversion, filtering, power amplification, transmission/reception) and digital beamforming, and includes a portion of the physical (PHY) layer. The RU may perform the DFE using massive multiple input/multiple output (MIMO) and may be integrated with one or more antennas of the gNBs. The DU may host the Radio Link Control (RLC), Medium Access Control (MAC), and physical layers of a gNB. One DU can support one or more cells, and each cell is supported by a single DU. The operation of the DU may be controlled by the CU. The CU may be configured to perform functions for transferring user data, mobility control, radio access network sharing, positioning, session management, etc. although some functions are allocated exclusively to the DU. The CU may host the Radio Resource Control (RRC), Service Data Adaptation Protocol (SDAP), and Packet Data Convergence Protocol (PDCP) protocols of the gNB. The UE 1102 may communicate with the CU via RRC, SDAP, and PDCP layers, with the DU via the RLC, MAC, and PHY layers, and with the RU via the PHY layer.

In operation, the UE 1102 may be configured to provide one or more on-demand RF sensing request messages 1108 including parameters for one or more RF sensing waveforms. The one or more on-demand RF sensing request messages 1108 may include at least one of a requested waveform time domain parameter and/or a requested waveform periodicity parameter. For example, the waveform parameters may include the time domain duration $T_{radar\_RS}$ 606. The waveform parameter may indicate a minimum sensing range ($R_{min}$) which the LMF 1106 may use to compute $T_{radar\_RS}$. That is, $T_{radar\_RS}=2*R_{min}/c$ since the receiver is off when the RS is transmitted in half-duplex monostatic sensing. The waveform parameter may indicate the periodicity $T_{sensing}$ value or the maximum sensing range ($R_{max}$), which may be used to compute the $T_{sensing}$ value as described in equation (1). Other parameters, such as a RF sensing start time, end time (or duration), or other use case parameters may be included in the on-demand RF sensing request messages 1108. At stage 1110, the LMF 1106 may be configured to determine the RS sensing configuration based at least in part on the information provided in the one or more On-demand RF sensing request. The LMF 1106 may be configured to configure RF sensing operations based on the OFDM/CP-OFDM numerologies as described in FIGS. 8-10. For example, the RF sensing waveform may be TDM'd and/or FDM'd with the communications waveform in a numerology. Mixed numerologies may also be configured. The LMF 1106 may be configured to provide one or more RF sensing configuration messages 1112 to network stations, such as the UE 1102 and the gNB 1104 with a slot plan to accommodate the RF sensing operations requested by the UE 1102. In an example, the content of the RF sensing configuration messages 1112 may be included in assistance data provided to the UE 1102 from a network entity, such as the LMF 1106 or the gNB 1104 (e.g. a serving base station). In general, assistance data may include network supplied information to enable mobile devices to perform network tasks such as communicating on the network, performing positioning computations, and performing RF sensing operations. The assistance data may include numerology and slot plan information, and RF sensing configuration information such as the RF sensing waveform information including the $T_{radar\_RS}$ and $T_{sensing}$ values. At stage 1114, the UE 1102 and/or the gNB 1104 (or other wireless node) may be configured to perform half-duplex monostatic RF sensing operations based on the configuration messages 1112. For example, the UE 1102 (or the gNB 1104) may be configured to utilize an RF sensing waveform based on $T_{radar\_RS}$ and $T_{sensing}$ values included in the RF sensing configuration messages 1112. The results of the RF sensing operations at stage 1114 may be utilized by one or more local applications executing on the UE 1102 (e.g., intruder alert application, fall detection application, etc.). Optionally, the UE 1102 may be configured to provide one or more RF sensing reporting messages 1116 to provide the RF sensing results to one or more network entities, such as the LMF 1106.

Figure 11B:
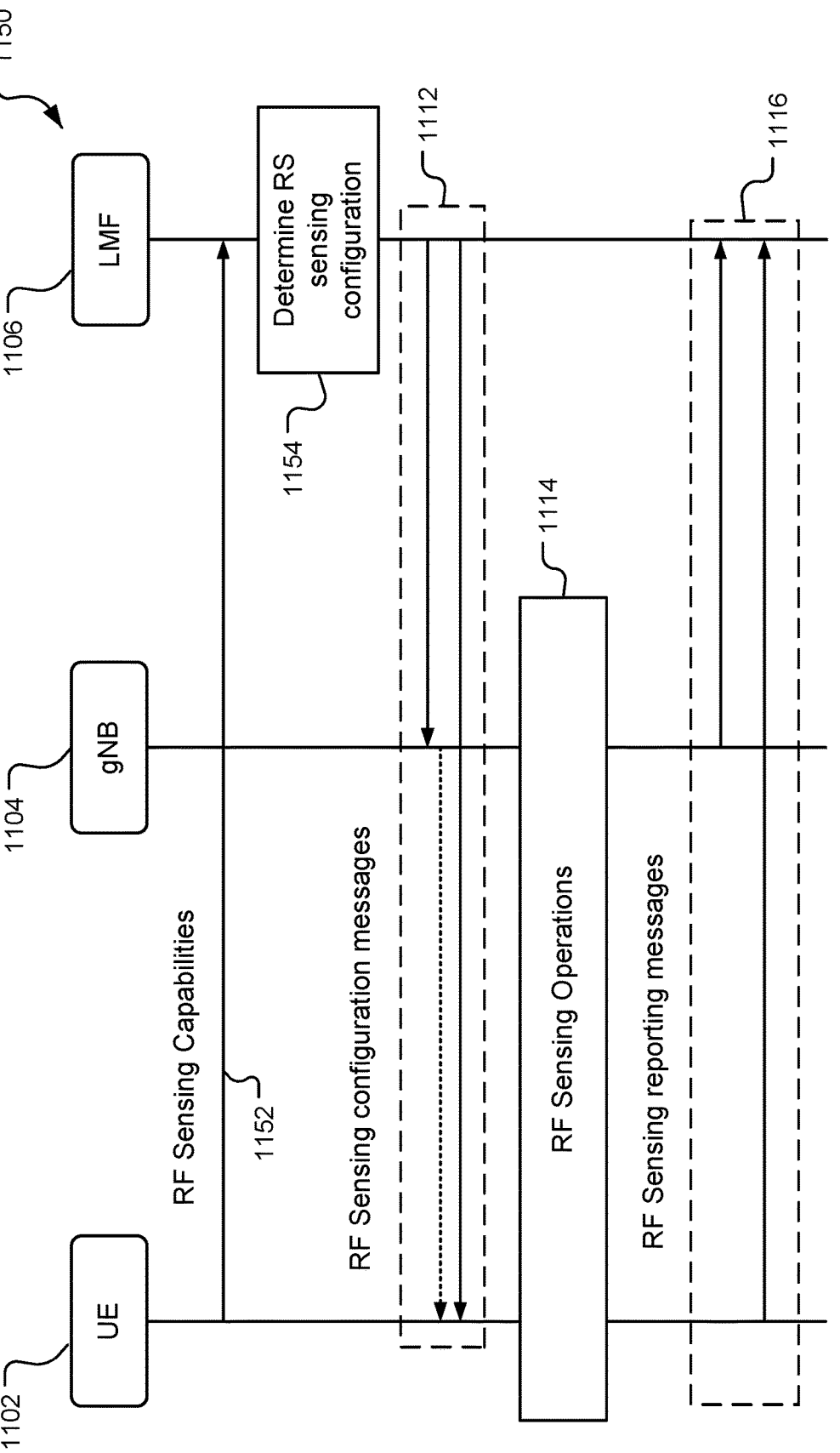
FIG. 11B is an example message flow diagram for providing network assigned radio frequency sensing configuration information.

Referring to FIG. 11B, with further reference to FIG. 11A, an example message flow diagram 1150 for providing network assigned radio frequency sensing configuration information is shown. The UE 1102 may be configured to provide one or more RF sensing capabilities messages 1152 to a network entity (e.g., the LMF 1106) which include one or more parameters associated with the capabilities of the UE 1102 to perform RF sensing operations. The gNB 1104 may also be configured to provide capabilities information to the network based on the capabilities of the gNB 1104 and/or the combination of capabilities of the UE 1102 and the gNB 1104 to perform RF sensing operations. The RF sensing capabilities parameters may include the Rx/Tx response time to indicate the speed at which the UE 1102 can switch between receive and transmit modes (e.g., a receive-to-transmit switch time). Other parameters may include tuning gap information, bandwidth preferences and the ability to support mixed numerologies (e.g., preferred SCS values).

Other parameters, such as the ability to support FMCW and/or OFDM reference signals for RF sensing may be included in the RF sensing capabilities messages 1152.

At stage 1154, the network entity (e.g., LMF 1106) may be configured to determine the RF sensing configuration based at least in part on the capabilities of the UE 1102. The RF sensing configuration may include parameters for one or more RF sensing waveforms. For example, the waveform parameters may include the time domain duration $T_{radar\_RS}$ 606, a minimum sensing range ($R_{min}$), the periodicity $T_{sensing}$ value, and the maximum sensing range ($R_{max}$). Other parameters, such as a RF sensing start time, end time (or duration), or other use case parameters may be included in the RF sensing configuration. The RF sensing configuration may be based on OFDM/CP-OFDM numerologies such as described in FIGS. 8-10. For example, the RF sensing waveform may be TDM'd and/or FDM'd with the communications waveform in a numerology. Mixed numerologies may also be configured at stage 1154. The LMF 1106 may be configured to provide one or more RF sensing configuration messages 1112 to network stations, such as the UE 1102 and the gNB 1104 with a slot plan to accommodate the RF sensing operations based on the capabilities of the UE 1102 and the gNB 1104. At stage 1114, the UE 1102 and/or the gNB 1104 may be configured to perform half-duplex monostatic RF sensing operations based on the configuration messages 1112 as described in FIG. 11A. The results of the RF sensing operations at stage 1114 may be included in one or more RF sensing reporting messages 1116.

Figure 12:
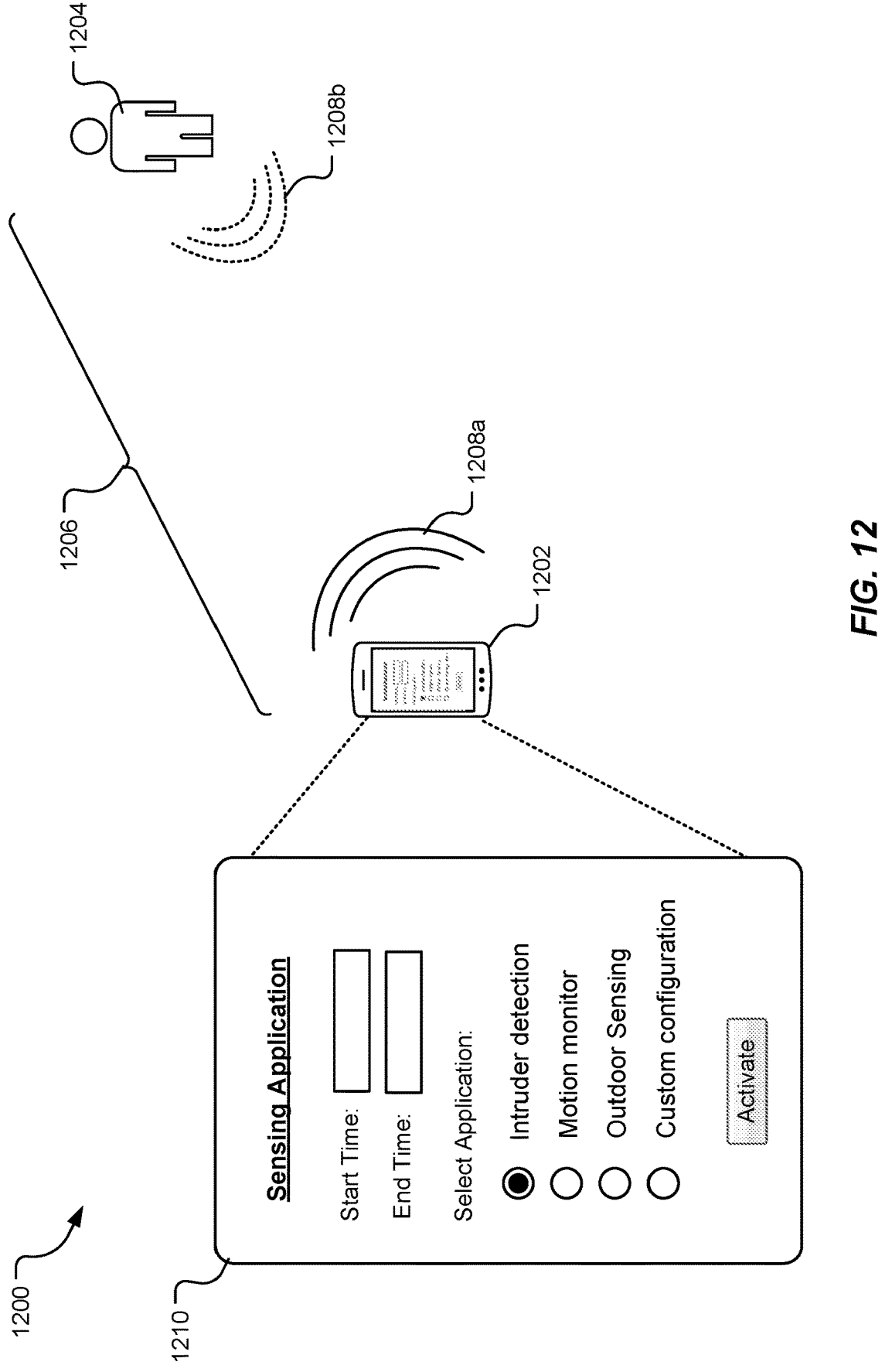
FIG. 12 is an example use case diagram for an RF sensing security application.

Referring to FIG. 12, an example use case diagram 1200 for an RF sensing security application is shown. A UE 1202 may be configured to execute an application to utilize half-duplex monostatic RF sensing as described herein. The UE 1202 may include some or all of the components of the UE 302, and the UE 302 may be an example of the UE 1202. The application may include a user interface 1210 configured to receive RF sensing requirements from a user. For example, in a security application, a user may configure the UE 1202 to perform RF sensing in a time period (e.g., a start time, end time, duration, etc.). The user may also be able to explicitly or implicitly define a target classification and an range requirement. An implicit selection may be based on a choice of RF sensing application, such as intruder detection, motion monitoring, or outdoor sensing. For example, an intruder detection application may configure a RF sensing waveform 1208a based on a range 1206 of approximately 20 m to detect a human sized object 1204. The UE 1202 may then be configured to transmit the waveform 1208a and receive the echo signal 1208b returning from the object 1204. A motion monitor application may have a reduce range (e.g., 5 m or less) and utilize a different waveform (e.g., a smaller $T_{sensing}$ value). An outdoor sensing application may utilize a different waveform configured for longer ranges (e.g., up to 100 m). Custom configuration parameters may enable the user to select a desired range and object size. Other parameters may be used to capture expected object speed and/or measurement accuracy (e.g., RF sensing quality of service requirement).

In operation, the UE 1202 may be configured to utilize the input to the UI 1210 to generate one or more on-demand RF sensing request messages 1108 to request an RF sensing configuration based on the user's choices. The LMF 1106, or other network entity, may be configured to provide the RF sensing waveform parameters and schedule based at least in part on the on-demand request. For example, the waveform parameters may include the time domain duration $T_{radar\_RS}$

606 and the periodicity $T_{sensing}$ value 608 based on the range 1206. Larger objects may utilize a smaller (e.g., less time) $T_{radar\_RS}$ and increased accuracy may require a smaller $T_{sensing}$ and/or an increased number of pulses. Other parameters such as start and stop times and mixed numerology configurations may also be based at least in part on the on-demand request.

Figure 13:
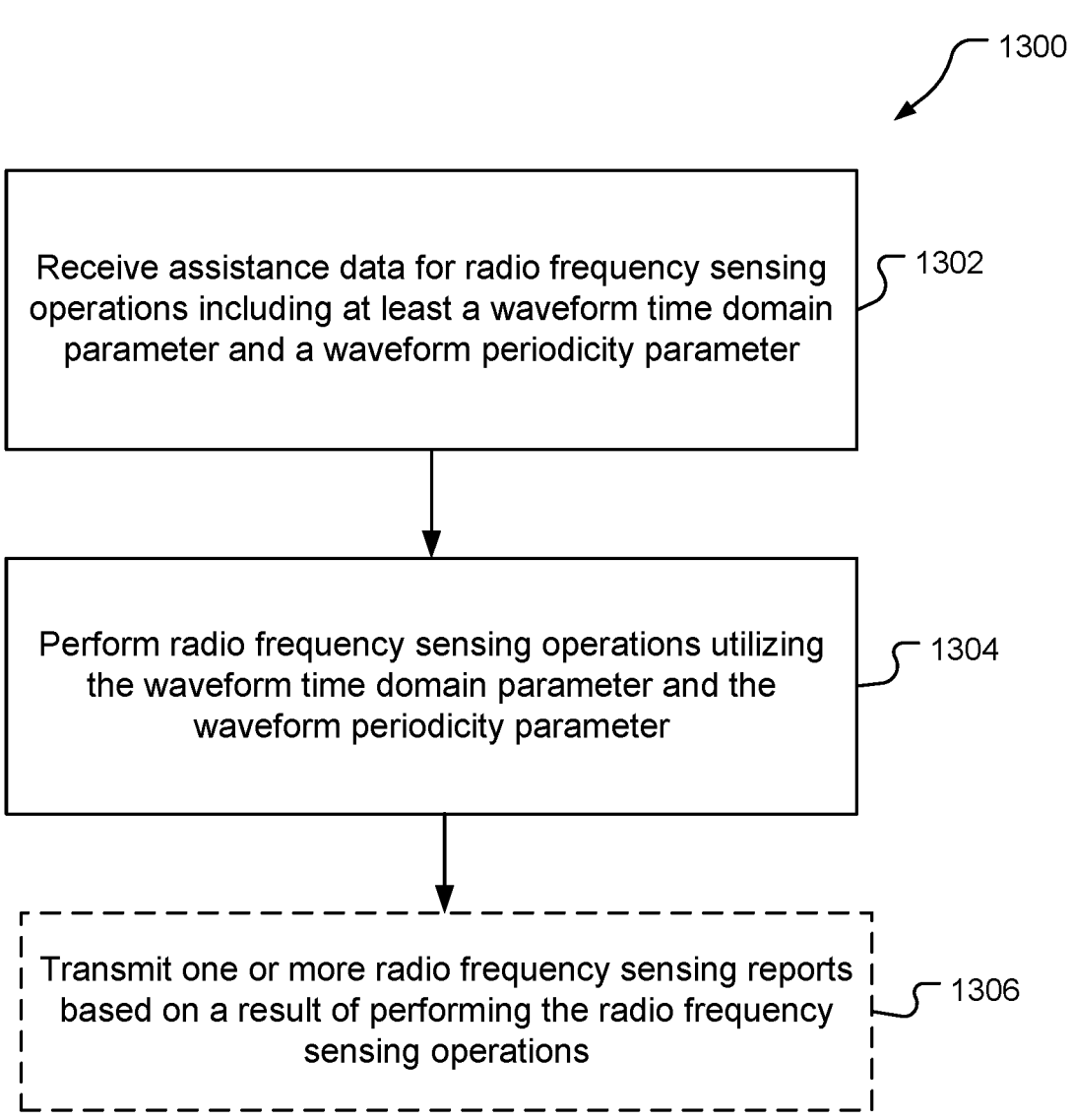
FIG. 13 is an example process flow diagram of a method for performing RF sensing operations.

Referring to FIG. 13, with further reference to FIGS. 1-12, a method 1300 for performing RF sensing operations includes the stages shown. A UE 302 or a base station 304, or other wireless nodes described herein, may be configured to perform RF sensing operations. The method 1300 is, however, an example and not limiting. The method 1300 may be altered, e.g., by having stages added, removed, rearranged, combined, performed concurrently, and/or having single stages split into multiple stages. For example, transmitting one or more RF sensing reports at stage 1306 is optional.

At stage 1302, the method includes receiving assistance data for radio frequency sensing operations including at least a waveform time domain parameter and a waveform periodicity parameter. A UE 302, including one or more transceivers 310, 320, and a processing system 332, is a means for receiving the assistance data for RF sensing operations. In an example, the assistance data may be included in one or more RF sensing configuration messages 1112 received from a network entity, such as the LMF 1106, a base station, such as the gNB 1104 (e.g., a serving base station). The assistance data includes RF sensing waveform parameters such as the time domain duration $T_{radar\_RS}$ 606 (i.e., a waveform time domain parameter) and the periodicity $T_{sensing}$ value 608 (i.e., a waveform periodicity parameter). The assistance data may also include mixed numerologies for the RF sensing waveforms such as the OFDM/CP-OFDM configurations for at least a first SCS and a second SCS as depicted in FIG. 9. The assistance data may include additional information to enable TDM or FDM with communication operations. In an example, the assistance data may be received via over-the-air signaling protocols such as RRC (e.g., one or more System Information Blocks (SIBs)), Downlink Control Information (DCI) and/or Medium Access Control (MAC) signaling. Other signaling techniques may also be used to receive the assistance data.

At stage 1304, the method includes performing radio frequency sensing operations utilizing the waveform time domain parameter and the waveform periodicity parameter. The UE 302, including the one or more transceivers 310, 320, the processing system 332, and the RF sensing components 342, is a means for performing RF sensing operations. A wireless node (e.g., UE 302) may be configured to utilize an RF sensing waveform based on $T_{radar\_RS}$ and $T_{sensing}$ values received at stage 1302 for half-duplex monostatic RF sensing. For example, a UE may include an intruder detection application configured to utilize a RF sensing waveform based on a range of approximately 20 m to detect a human sized object. The UE may include a motion monitor application configured to utilize a waveform for reduce ranges (e.g., a smaller $T_{sensing}$ value). The UE may include an outdoor sensing application configured to utilize a waveform for longer ranges (e.g., up to 100 m). The assistance data may include custom configuration parameters to capture expected object speed and/or measurement accuracy (e.g., RF sensing quality of service requirement).

At stage 1306, the method optionally includes transmitting one or more radio frequency sensing reports based on a result of performing the radio frequency sensing operations. The UE 302, including the one or more transceivers 310, 320 and the processing system 332 is a means for transmitting one or more RF sensing reports. In an example, referring to FIG. 11A, a UE may be configured to provide one or more RF sensing reporting messages 1116 to provide the RF sensing results to one or more network entities, such as an LMF. The RF sensing reports may include range information to detected objects. Other information, such as local deactivation of RF sensing operations or initial detection alerts (e.g., intruder application) may be provided in the RF sensing reports. Device state information, such as battery power level, charging state, device orientation, and other sensor inputs may also be included in the RF sensing reports.

Referring to FIG. 14, with further reference to FIGS. 1-12, a method 1400 for providing radio frequency sensing assistance data includes the stages shown. A network entity 306 or a base station 304, or other network resources described herein, may be configured to provide RF sensing assistance data. The method 1400 is, however, an example and not limiting. The method 1400 may be altered, e.g., by having stages added, removed, rearranged, combined, performed concurrently, and/or having single stages split into multiple stages. For example, receiving one or more RF sensing reports at stage 1408 is optional.

At stage 1402, the method includes receiving radio frequency sensing information from a wireless node. A network entity 306, including one or more network interfaces 390, and a processing system 394, is a means for receiving RF sensing information. In an example, referring to FIG. 11A, the RF sensing information may be one or more on-demand RF sensing request messages 1108 provided by the wireless node (e.g., the UE 1102 or the gNB 1104). Referring to FIGS. 11A and 11B, the LMF 1106 and the gNB 1104 are examples of the network entity 306. The RF sensing information may include an indication of a RF sensing use case, such as intruder alert, motion monitoring, fall detection, or other RF sensing applications to be executed by the wireless node. In an example, the RF sensing information may include implicit waveform parameters such as $T_{radar\_RS}$ and $T_{sensing}$ values, or other parameters utilized by the wireless node for performing half-duplex monostatic RF sensing operations. The RF sensing information may include one or more parameters associated with the capabilities of the wireless node to perform RF sensing operations (e.g., one or more RF sensing capabilities messages 1152). The RF sensing capabilities parameters may include the Rx/Tx response time to indicate the speed at which the wireless node can switch between receive and transmit modes. Other parameters may include tuning gap information, bandwidth preferences and the ability to support mixed numerologies (e.g., preferred SCS values). The RF sensing information may include other parameters, such as the ability to support FMCW and/or OFDM reference signals.

At stage 1404, the method includes generating assistance data based on the radio frequency sensing information, wherein the assistance data includes at least a waveform time domain parameter and a waveform periodicity parameter. The network entity 306, including the one or more network interfaces 390 and the processing system 394, is a means for generating assistance data. The network entity 306 may be configured to utilize RF sensing information received at stage 1402, such as sensing range, UE capabilities, object speed, object size, etc. to generate RF sensing waveforms.

For example, the generated assistance data may include RF sensing waveform parameters such as the time domain duration $T_{radar\_RS}$ 606 (i.e., a waveform time domain parameter) and the periodicity $T_{sensing}$ value 608 (i.e., a waveform periodicity parameter). The assistance data may also include mixed numerologies for the RF sensing waveforms such as the OFDM/CP-OFDM configurations for at least a first SCS and a second SCS as depicted in FIG. 9. The assistance data may include additional information to enable TDM or FDM with communication operations.

At stage 1406, the method includes providing the assistance data to the wireless node. The network entity 306, including the one or more network interfaces 390 and the processing system 394, is a means for providing the assistance data. In an example, the network entity 306 may be configured to utilize LLP messaging to provide the assistance data to a UE or other wireless node. Other signaling, which may utilize a serving gNB, such as RRC, DCI, and MAC (e.g., MAC-Control Element) may be implemented to provide the assistance data. Other signaling techniques may also be used. In an example, referring to FIGS. 11A, 11B, the assistance data may be included in one or more RF sensing configuration messages 1112 provided by the LMF 1106 and/or the gNB 1104. In an example, the gNB 1104 may be the serving station for the UE 1102 and may be configured to provide assistance data to the UE 1102.

At stage 1408, the method optionally includes receiving one or more radio frequency sensing reports from the wireless node. The network entity 306, including the one or more network interfaces 390 and the processing system 394, is a means for receiving the one or more RF sensing reports. In an example, referring to FIGS. 11A and 11B, the wireless node (e.g., UE 1102) may be configured to provide one or more RF sensing reporting messages 1116 to provide the RF sensing results to one or more network entities. The RF sensing reports may include range information on detected objects, as well as other information such as local deactivation of RF sensing operations or initial detection alerts (e.g., intruder application) may be provided in the RF sensing reports. Device state information, such as battery power level, charging state, device orientation, and other sensor inputs may also be included in the RF sensing reports.

The methods 1300 and 1400 may be performed by different wireless nodes in a communication network, including base stations and mobile devices. In an example, the wireless nodes may be configured to perform RF sensing operations with sidelink protocols. For example, a first UE may be configured to provide assistance data and transmit communication and RF sensing waveform information to a second UE based on the waveform parameters as described herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order.

Furthermore, although elements of the disclosure may be described or claimed in the singular, the plural is contemplated unless limitation to the singular is explicitly stated.

Implementation examples are described in the following numbered clauses:

Clause 1. A method for performing RF sensing operations, comprising: receiving assistance data for radio frequency sensing operations including at least a waveform time domain parameter and a waveform periodicity parameter; and performing radio frequency sensing operations utilizing the waveform time domain parameter and the waveform periodicity parameter.

Clause 2. The method of clause 1, further comprising receiving numerology information for a cyclic prefix orthogonal frequency division multiplexing scheme, wherein the waveform periodicity parameter is less than a cyclic prefix duration in the cyclic prefix orthogonal frequency division multiplexing scheme.

Clause 3. The method of clause 2, wherein the waveform periodicity parameter is an integer quotient of the cyclic prefix duration.

Clause 4. The method of clause 1, further comprising receiving numerology information for a cyclic prefix orthogonal frequency division multiplexing scheme, wherein the waveform periodicity parameter is less than a symbol duration in the cyclic prefix orthogonal frequency division multiplexing scheme.

Clause 5. The method of clause 4, wherein the waveform periodicity parameter is an integer quotient of the symbol duration.

Clause 6. The method of clause 1, wherein the radio frequency sensing operations are time division multiplexed with communication symbols in an orthogonal frequency division multiplexing scheme.

Clause 7. The method of clause 1, further comprising receiving mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations.

Clause 8. The method of clause 7, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a cyclic prefix duration in the second cyclic prefix orthogonal frequency division multiplexing scheme.

Clause 9. The method of clause 7, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a symbol duration in the second cyclic prefix orthogonal frequency division multiplexing scheme.

Clause 10. The method of clause 1, further comprising transmitting one or more on-demand radio frequency sensing request messages including at least one of a requested waveform time domain parameter and a requested waveform periodicity parameter.

Clause 11. The method of clause 1, further comprising transmitting a radio frequency sensing capabilities message prior to receiving the assistance data for radio frequency sensing operations, wherein the assistance data for radio frequency sensing operations is based at least in part on the radio frequency sensing capabilities message.

Clause 12. The method of clause 11, wherein the radio frequency sensing capabilities message includes an indication of a receive-to-transmit switch time.

Clause 13. A method for providing radio frequency sensing assistance data, comprising: receiving radio frequency sensing information from a wireless node; generating assistance data based on the radio frequency sensing information, wherein the assistance data includes at least a waveform time domain parameter and a waveform periodicity parameter; and providing the assistance data to the wireless node.

Clause 14. The method of clause 13, wherein the assistance data further comprises numerology information for a cyclic prefix orthogonal frequency division multiplexing scheme, and the waveform periodicity parameter is less than a cyclic prefix duration in the cyclic prefix orthogonal frequency division multiplexing scheme.

Clause 15. The method of clause 14, wherein the waveform periodicity parameter is an integer quotient of the cyclic prefix duration.

Clause 16. The method of clause 13, wherein the assistance data further comprises numerology information for an orthogonal frequency division multiplexing scheme, and the waveform periodicity parameter is less than a symbol duration in the orthogonal frequency division multiplexing scheme.

Clause 17. The method of clause 16, wherein the waveform periodicity parameter is an integer quotient of the symbol duration.

Clause 18. The method of clause 13, wherein the assistance data further comprises mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations.

Clause 19. The method of clause 18, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a cyclic prefix duration in the second cyclic prefix orthogonal frequency division multiplexing scheme.

Clause 20. The method of clause 18, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a symbol duration in the second cyclic prefix orthogonal frequency division multiplexing scheme.

Clause 21. The method of clause 13, wherein the radio frequency sensing information comprises one or more on-demand radio frequency sensing request messages including at least one of a requested waveform time domain parameter and a requested waveform periodicity parameter.

Clause 22. The method of clause 13, wherein the radio frequency sensing information comprises a radio frequency sensing capabilities message including an indication of a capability of the wireless node to perform radio sensing operations.

Clause 23. The method of clause 22, wherein the indication of the capability includes a receive-to-transmit switch time for the wireless node.

Clause 24. The method of clause 13, further comprising receiving one or more radio frequency sensing reports from the wireless node.

Clause 25. An apparatus, comprising: at least one memory; at least one transceiver; at least one processor communicatively coupled to the at least one memory and the at least one transceiver, and configured to: receive assistance data for radio frequency sensing operations including at least a waveform time domain parameter and a waveform periodicity parameter; and perform radio frequency sensing operations utilizing the waveform time domain parameter and the waveform periodicity parameter.

Clause 26. The apparatus of clause 25, wherein the at least one processor is further configured to receive numerology information for a cyclic prefix orthogonal frequency division multiplexing scheme, wherein the waveform periodicity parameter is less than a cyclic prefix duration in the cyclic prefix orthogonal frequency division multiplexing scheme.

Clause 27. The apparatus of clause 26, wherein the waveform periodicity parameter is an integer quotient of the cyclic prefix duration.

Clause 28. The apparatus of clause 25, wherein the at least one processor is further configured to receive numerology information for a cyclic prefix orthogonal frequency division multiplexing scheme, wherein the waveform periodicity parameter is less than a symbol duration in the cyclic prefix orthogonal frequency division multiplexing scheme.

Clause 29. The apparatus of clause 28, wherein the waveform periodicity parameter is an integer quotient of the symbol duration.

Clause 30. The apparatus of clause 25, wherein the radio frequency sensing operations are time division multiplexed with communication symbols in an orthogonal frequency division multiplexing scheme.

Clause 31. The apparatus of clause 25, wherein the at least one processor is further configured to receive mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations.

Clause 32. The apparatus of clause 31, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a cyclic prefix duration in the second cyclic prefix orthogonal frequency division multiplexing scheme.

Clause 33. The apparatus of clause 31, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a symbol duration in the second cyclic prefix orthogonal frequency division multiplexing scheme.

Clause 34. The apparatus of clause 25, wherein the at least one processor is further configured to transmit one or more on-demand radio frequency sensing request messages including at least one of a requested waveform time domain parameter and a requested waveform periodicity parameter.

Clause 35. The apparatus of clause 25, wherein the at least one processor is further configured to transmit a radio frequency sensing capabilities message prior to receiving the assistance data for radio frequency sensing operations, wherein the assistance data for radio frequency sensing operations is based at least in part on the radio frequency sensing capabilities message.

Clause 36. The apparatus of clause 35, wherein the radio frequency sensing capabilities message includes an indication of a receive-to-transmit switch time.

Clause 37. An apparatus, comprising: at least one memory; at least one transceiver; at least one processor communicatively coupled to the at least one memory and the at least one transceiver, and configured to: receive radio frequency sensing information from a wireless node; generate assistance data based on the radio frequency sensing information, wherein the assistance data includes at least a waveform time domain parameter and a waveform periodicity parameter; and provide the assistance data to the wireless node.

Clause 38. The apparatus of clause 37, wherein the assistance data further comprises numerology information for a cyclic prefix orthogonal frequency division multiplexing scheme, and the waveform periodicity parameter is less than a cyclic prefix duration in the cyclic prefix orthogonal frequency division multiplexing scheme.

Clause 39. The apparatus of clause 38, wherein the waveform periodicity parameter is an integer quotient of the cyclic prefix duration.

Clause 40. The apparatus of clause 37, wherein the assistance data further comprises numerology information for an orthogonal frequency division multiplexing scheme, and the waveform periodicity parameter is less than a symbol duration in the orthogonal frequency division multiplexing scheme.

Clause 41. The apparatus of clause 40, wherein the waveform periodicity parameter is an integer quotient of the symbol duration.

Clause 42. The apparatus of clause 37, wherein the assistance data further comprises mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations.

Clause 43. The apparatus of clause 42, where the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a cyclic prefix duration in the second cyclic prefix orthogonal frequency division multiplexing scheme.

Clause 44. The apparatus of clause 42, where the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a symbol duration in the second cyclic prefix orthogonal frequency division multiplexing scheme.

Clause 45. The apparatus of clause 37, wherein the radio frequency sensing information comprises one or more on-demand radio frequency sensing request messages including at least one of a requested waveform time domain parameter and a requested waveform periodicity parameter.

Clause 46. The apparatus of clause 37, wherein the radio frequency sensing information comprises a radio frequency sensing capabilities message including an indication of a capability of the wireless node to perform radio sensing operations.

Clause 47. The apparatus of clause 46, wherein the indication of the capability includes a receive-to-transmit switch time for the wireless node.

Clause 48. The apparatus of clause 37, wherein the at least one processor is further configured to receive one or more radio frequency sensing reports from the wireless node.

Clause 49. An apparatus for performing RF sensing operations, comprising:
  means for receiving assistance data for radio frequency sensing operations including at least a waveform time domain parameter and a waveform periodicity parameter; and performing radio frequency sensing operations utilizing the waveform time domain parameter and the waveform periodicity parameter.

Clause 50. An apparatus for providing radio frequency sensing assistance data, comprising: means for receiving radio frequency sensing information from a wireless node; means for generating assistance data based on the radio frequency sensing information, wherein the assistance data includes at least a waveform time domain parameter and a waveform periodicity parameter; and means for providing the assistance data to the wireless node.

Clause 51. A non-transitory processor-readable storage medium comprising processor-readable instructions configured to cause one or more processors to perform RF sensing operations, comprising code for: receiving assistance data for radio frequency sensing operations including at least a waveform time domain parameter and a waveform periodicity parameter; and performing radio frequency sensing operations utilizing the waveform time domain parameter and the waveform periodicity parameter.

Clause 52. A non-transitory processor-readable storage medium comprising processor-readable instructions configured to cause one or more processors to provide radio frequency sensing assistance data, comprising code for: receiving radio frequency sensing information from a wireless node; generating assistance data based on the radio frequency sensing information, wherein the assistance data includes at least a waveform time domain parameter and a waveform periodicity parameter; and providing the assistance data to the wireless node.

What is claimed is:

1. A method for performing RF sensing operations, comprising:
  receiving assistance data for radio frequency sensing operations including at least a waveform time domain parameter and a waveform periodicity parameter;
  receiving mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations; and performing radio frequency sensing operations utilizing the waveform time domain parameter and the waveform periodicity parameter.

2. The method of claim 1, wherein the waveform periodicity parameter is less than a cyclic prefix duration in the second cyclic prefix orthogonal frequency division multiplexing scheme.

3. The method of claim 2, wherein the waveform periodicity parameter is an integer quotient of the cyclic prefix duration.

4. The method of claim 1, wherein the waveform periodicity parameter is less than a symbol duration in the second cyclic prefix orthogonal frequency division multiplexing scheme.

5. The method of claim 4, wherein the waveform periodicity parameter is an integer quotient of the symbol duration.

6. The method of claim 1, wherein the radio frequency sensing operations are time division multiplexed with communication symbols in an orthogonal frequency division multiplexing scheme.

7. The method of claim 1, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a cyclic prefix duration in the second cyclic prefix orthogonal frequency division multiplexing scheme.

8. The method of claim 1, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a symbol duration in the second cyclic prefix orthogonal frequency division multiplexing scheme.

9. The method of claim 1, further comprising transmitting one or more on-demand radio frequency sensing request messages including at least one of a requested waveform time domain parameter and a requested waveform periodicity parameter.

10. The method of claim 1, further comprising transmitting a radio frequency sensing capabilities message prior to receiving the assistance data for radio frequency sensing operations, wherein the assistance data for radio frequency sensing operations is based at least in part on the radio frequency sensing capabilities message.

11. The method of claim 10, wherein the radio frequency sensing capabilities message includes an indication of a receive-to-transmit switch time.

12. A method for providing radio frequency sensing assistance data, comprising:

receiving radio frequency sensing information from a wireless node;

generating assistance data based on the radio frequency sensing information, wherein the assistance data includes at least a waveform time domain parameter and a waveform periodicity parameter, and the assistance data further comprises mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations; and providing the assistance data to the wireless node.

13. The method of claim 12, wherein the waveform periodicity parameter is less than a cyclic prefix duration in the second cyclic prefix orthogonal frequency division multiplexing scheme.

14. The method of claim 13, wherein the waveform periodicity parameter is an integer quotient of the cyclic prefix duration.

15. The method of claim 12, the waveform periodicity parameter is less than a symbol duration in the second cyclic prefix orthogonal frequency division multiplexing scheme.

16. The method of claim 15, wherein the waveform periodicity parameter is an integer quotient of the symbol duration.

17. The method of claim 12, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a cyclic prefix duration in the second cyclic prefix orthogonal frequency division multiplexing scheme.

18. The method of claim 12, wherein the first cyclic prefix orthogonal frequency division multiplexing scheme has a first subcarrier spacing, and the second cyclic prefix orthogonal frequency division multiplexing scheme has a second subcarrier spacing that is greater than the first subcarrier spacing, and the waveform periodicity parameter is less than a symbol duration in the second cyclic prefix orthogonal frequency division multiplexing scheme.

19. The method of claim 12, wherein the radio frequency sensing information comprises one or more on-demand radio frequency sensing request messages including at least one of a requested waveform time domain parameter and a requested waveform periodicity parameter.

20. The method of claim 12, wherein the radio frequency sensing information comprises a radio frequency sensing capabilities message including an indication of a capability of the wireless node to perform radio sensing operations.

21. The method of claim 20, wherein the indication of the capability includes a receive-to-transmit switch time for the wireless node.

22. The method of claim 12, further comprising receiving one or more radio frequency sensing reports from the wireless node.

23. An apparatus, comprising:

at least one memory;

at least one transceiver;

at least one processor communicatively coupled to the at least one memory and the at least one transceiver, and configured to:

receive assistance data for radio frequency sensing operations including at least a waveform time domain parameter and a waveform periodicity parameter;

receive mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations; and perform radio frequency sensing operations utilizing the waveform time domain parameter and the waveform periodicity parameter.

24. The apparatus of claim 23, wherein the waveform periodicity parameter is less than a cyclic prefix duration in the second cyclic prefix orthogonal frequency division multiplexing scheme.

25. The apparatus of claim 23, wherein the radio frequency sensing operations are time division multiplexed with communication symbols in an orthogonal frequency division multiplexing scheme.

26. The apparatus of claim 23, wherein the at least one processor is further configured to transmit one or more on-demand radio frequency sensing request messages including at least one of a requested waveform time domain parameter and a requested waveform periodicity parameter.

27. An apparatus, comprising:
at least one memory;
at least one transceiver;

at least one processor communicatively coupled to the at least one memory and the at least one transceiver, and configured to:

receive radio frequency sensing information from a wireless node;

receive mixed numerology information including a first cyclic prefix orthogonal frequency division multiplexing scheme and a second cyclic prefix orthogonal frequency division multiplexing scheme, wherein the first cyclic prefix orthogonal frequency division multiplexing scheme is configured for communication operations and the second cyclic prefix orthogonal frequency division multiplexing scheme is configured for radio frequency sensing operations;

generate assistance data based on the radio frequency sensing information, wherein the assistance data includes at least a waveform time domain parameter and a waveform periodicity parameter; and provide the assistance data to the wireless node.

28. The apparatus of claim 27, wherein the waveform periodicity parameter is less than a cyclic prefix duration in the second cyclic prefix orthogonal frequency division multiplexing scheme.

* * * * *